US012567999B2

(12) United States Patent
Elshafie et al.

(10) Patent No.: US 12,567,999 B2
(45) Date of Patent: Mar. 3, 2026

(54) BUNDLE SIZE REPORTING FOR PRECODING RESOURCE BLOCK GROUPS

(71) Applicant: QUALCOMM INCORPORATED, San Diego, CA (US)

(72) Inventors: Ahmed Elshafie, San Diego, CA (US); Alexandros Manolakos, Athens (GR); Abdelrahman Mohamed Ahmed Mohamed Ibrahim, San Diego, CA (US); Yu Zhang, San Diego, CA (US); Muhammad Sayed Khairy Abdelghaffar, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 86 days.

(21) Appl. No.: 18/695,277

(22) PCT Filed: Dec. 2, 2021

(86) PCT No.: PCT/CN2021/134935
§ 371 (c)(1),
(2) Date: Mar. 25, 2024

(87) PCT Pub. No.: WO2023/097586
PCT Pub. Date: Jun. 8, 2023

(65) Prior Publication Data
US 2024/0406032 A1 Dec. 5, 2024

(51) Int. Cl.
*H04W 28/16* (2009.01)
*H04L 25/02* (2006.01)
(52) U.S. Cl.
CPC ......... *H04L 25/0204* (2013.01); *H04W 28/16* (2013.01)
(58) Field of Classification Search
CPC ........................... H04L 25/0204; H04W 28/16
See application file for complete search history.

(56) References Cited

U.S. PATENT DOCUMENTS

| | | | |
|---|---|---|---|
| 10,868,591 B2 | 12/2020 | Xu et al. | |
| 2018/0324760 A1* | 11/2018 | Yuk | H04L 5/0048 |

(Continued)

FOREIGN PATENT DOCUMENTS

| | | |
|---|---|---|
| CN | 112910523 A | 6/2021 |
| WO | WO-2016118710 | 7/2016 |

(Continued)

OTHER PUBLICATIONS

Huawei., et al., "Introduction of Wideband PRG Size", 3GPP TSG-RAN WG2 Meeting #107bis, R2-1913717, Chongqing, China, Oct. 14-18, 2019, 75 Pages.

(Continued)

*Primary Examiner* — Rahel Guarino
(74) *Attorney, Agent, or Firm* — Holland & Hart LLP

(57) ABSTRACT

Methods, systems, and devices for wireless communications are described. A first wireless device may receive a first signal from a second wireless device and may identify a first bundle size for a precoding resource group (PRG) based on a characteristic of the first signal and, in some examples, based on performing channel estimation on the first signal. The first wireless device may transmit a feedback message to the second wireless device indicating a second bundle size for the PRG and associated with a second signal based on identifying the first bundle size. In some examples, the first wireless device may receive the second signal on a set of resources in accordance with the second bundle size. The first signal may be an example of a channel state information reference signal (CSI-RS), and the second signal may be an example of a precoded CSI-RS or a demodulation reference signal (DMRS).

30 Claims, 13 Drawing Sheets

(56)                    References Cited

U.S. PATENT DOCUMENTS

| | | |
|---|---|---|
| 2020/0389284 A1 | 12/2020 | Manolakos et al. |
| 2021/0050964 A1 | 2/2021 | Manolakos et al. |
| 2021/0092720 A1 | 3/2021 | Haghighat et al. |
| 2021/0144743 A1 | 5/2021 | Rastegardoost et al. |

FOREIGN PATENT DOCUMENTS

| | | |
|---|---|---|
| WO | WO-2020247152 A1 | 12/2020 |
| WO | WO-2021126887 A1 | 6/2021 |
| WO | WO-2021163982 A1 | 8/2021 |

OTHER PUBLICATIONS

International Search Report and Written Opinion—PCT/CN2021/134935—ISA/EPO—Jul. 4, 2022.
Huawei et al., "PRB Bundling Size for DL Data Precoding", R1-1705074, 3GPP TSG RAN WG1 Meeting #88bis, 3rd Generation Partnership Project, Mobile Competence Centre, 650, Route Des Lucioles, F-06921 Sophia-antipolis Cedex, France, vol. RAN WG1, No. Spokane, USA, Apr. 3, 2017-Apr. 7, 2017, Apr. 2, 2017, XP051243205, 7 Pages, Section 3.
Supplementary European Search Report—EP21966019—Search Authority—The Hague—Sep. 2, 2025.

* cited by examiner

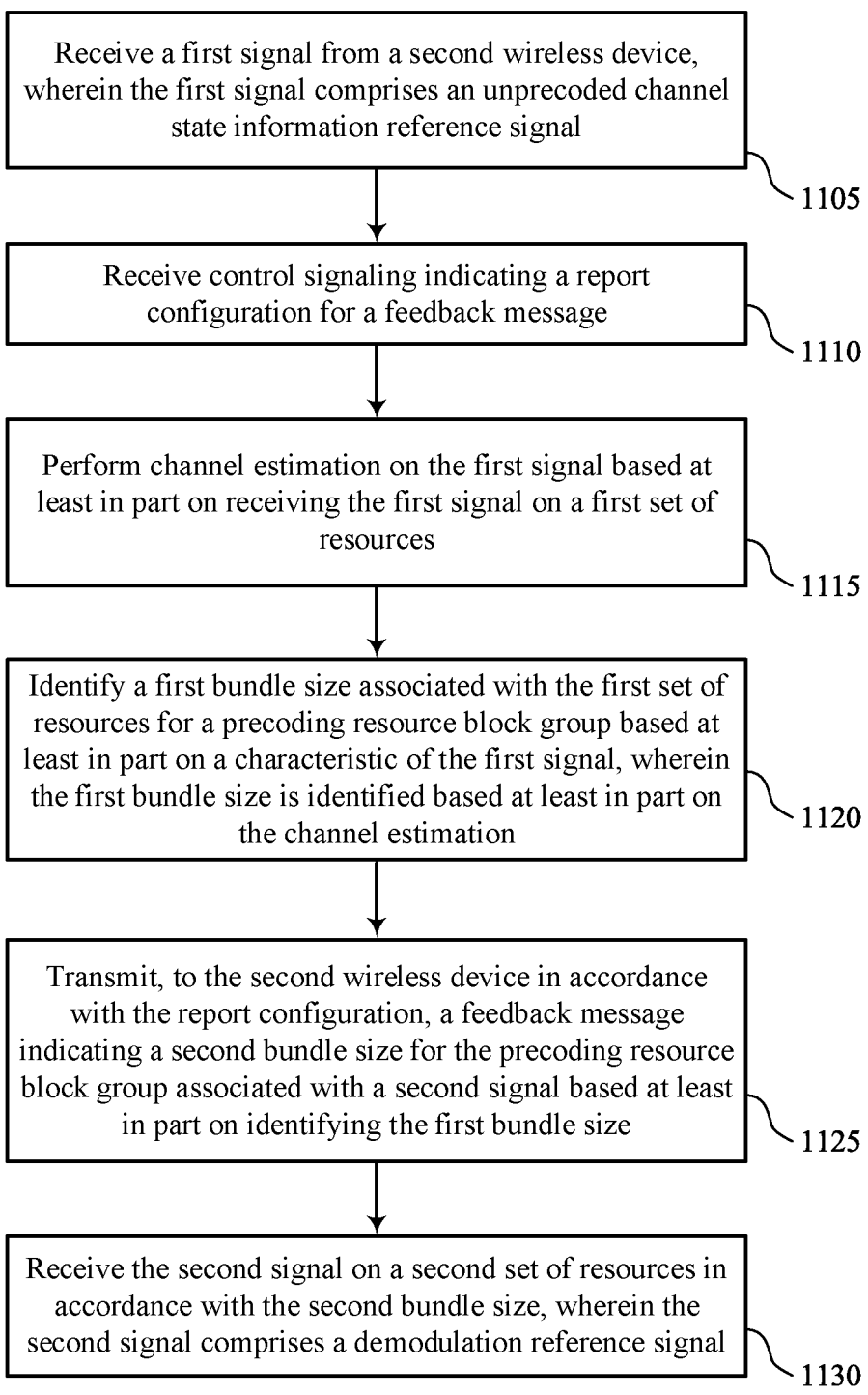

Receive a first signal from a second wireless device, wherein the first signal comprises an unprecoded channel state information reference signal

1105

Receive control signaling indicating a report configuration for a feedback message

1110

Perform channel estimation on the first signal based at least in part on receiving the first signal on a first set of resources

1115

Identify a first bundle size associated with the first set of resources for a precoding resource block group based at least in part on a characteristic of the first signal, wherein the first bundle size is identified based at least in part on the channel estimation

1120

Transmit, to the second wireless device in accordance with the report configuration, a feedback message indicating a second bundle size for the precoding resource block group associated with a second signal based at least in part on identifying the first bundle size

1125

Receive the second signal on a second set of resources in accordance with the second bundle size, wherein the second signal comprises a demodulation reference signal

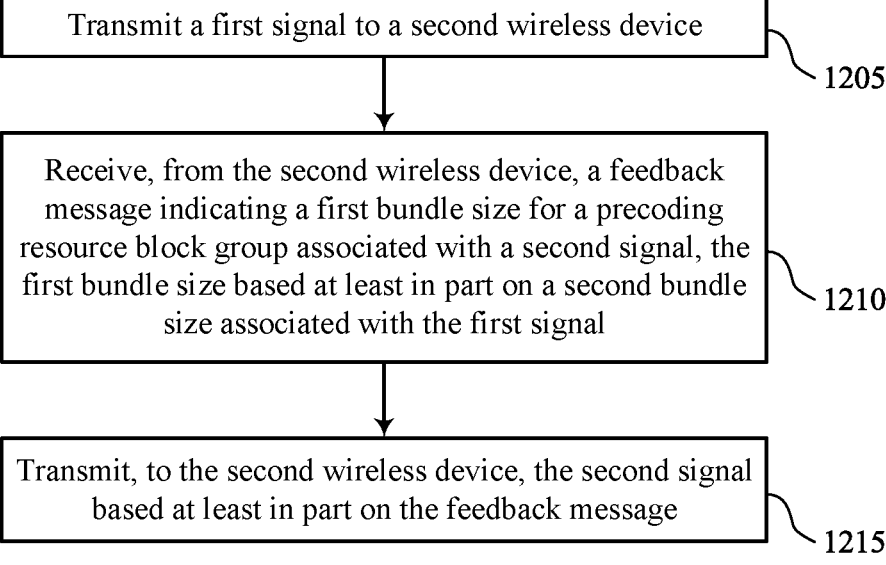

Transmit a first signal to a second wireless device

1205

Receive, from the second wireless device, a feedback message indicating a first bundle size for a precoding resource block group associated with a second signal, the first bundle size based at least in part on a second bundle size associated with the first signal

1210

Transmit, to the second wireless device, the second signal based at least in part on the feedback message

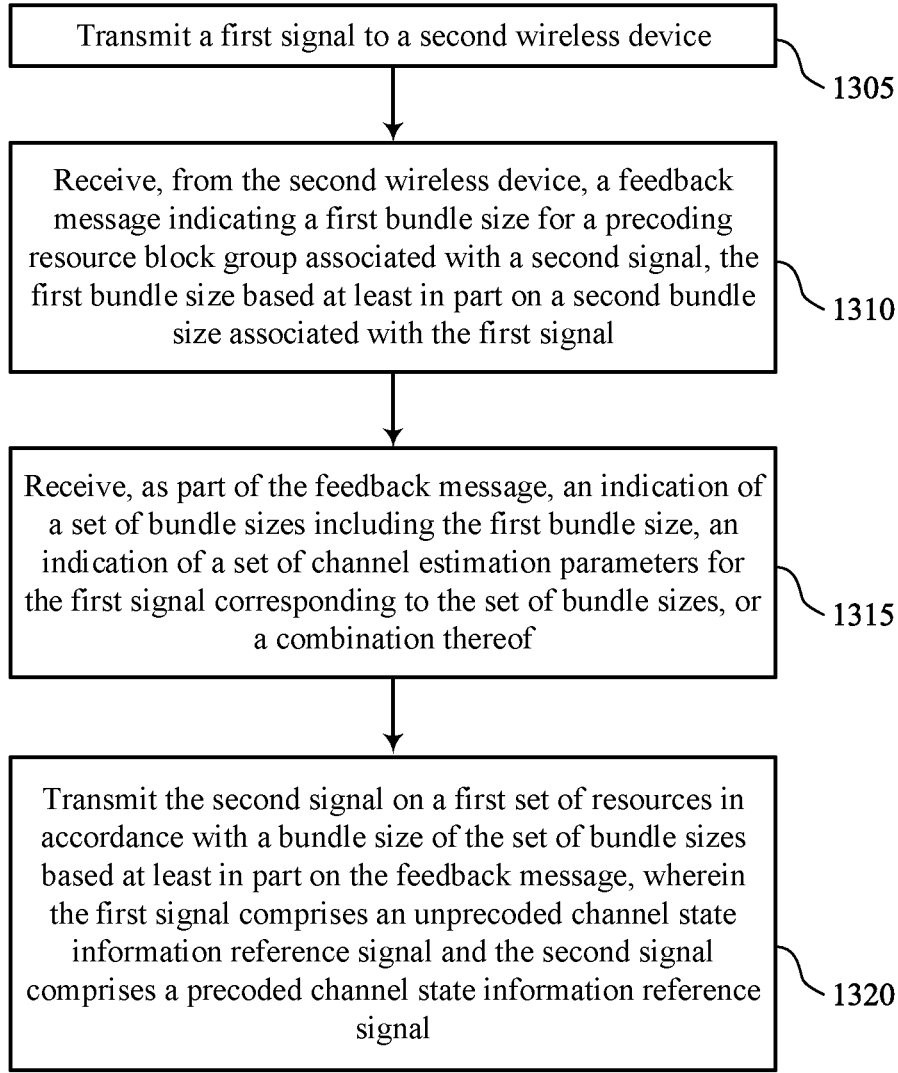

Transmit a first signal to a second wireless device

1305

Receive, from the second wireless device, a feedback message indicating a first bundle size for a precoding resource block group associated with a second signal, the first bundle size based at least in part on a second bundle size associated with the first signal

1310

Receive, as part of the feedback message, an indication of a set of bundle sizes including the first bundle size, an indication of a set of channel estimation parameters for the first signal corresponding to the set of bundle sizes, or a combination thereof

1315

Transmit the second signal on a first set of resources in accordance with a bundle size of the set of bundle sizes based at least in part on the feedback message, wherein the first signal comprises an unprecoded channel state information reference signal and the second signal comprises a precoded channel state information reference signal

BUNDLE SIZE REPORTING FOR PRECODING RESOURCE BLOCK GROUPS

CROSS REFERENCE

The present Application is a 371 national stage filing of International PCT Application No. PCT/CN2021/134935 by Elshafie et al. entitled "BUNDLE SIZE REPORTING FOR PRECODING RESOURCE BLOCK GROUPS," filed Dec. 2, 2021, which is assigned to the assignee hereof, and which is expressly incorporated by reference in its entirety herein.

FIELD OF TECHNOLOGY

The following relates to wireless communications, including bundle size reporting for precoding resource block groups.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A base station may transmit reference signals to a UE for use in channel estimation and link adaptation procedures. In some examples, the base station may precode some reference signals by applying a phase shift to one or more signals such that the signals reach an intended receiver in-phase (e.g., without destructively interfering). Precoding may be associated with a particular granularity or bundle size, indicating a number of resource blocks (RB) for which the precoding may not change. A UE may perform channel estimation across a group of bundled RBs based on the precoding granularity.

SUMMARY

The described techniques relate to improved methods, systems, devices, and apparatuses that support bundle size reporting for precoding resource groups (PRGs). Generally, the described techniques provide for a first wireless device, such as a user equipment (UE), to identify and report, to a second wireless device (e.g., a base station, a second UE), a PRG size (also referred to herein as a bundle size) for subsequent transmissions (e.g., reference signals) received at the UE. For example, a UE may determine or otherwise identify a PRG size based on a first signal received from a base station: the UE may, in some cases, identify the PRG size by performing channel estimation on the first signal, which may be an example of a channel state information (CSI) reference signal (CSI-RS). The UE may transmit a feedback message to the base station indicating the PRG size for a subsequent transmission (i.e., a second signal, such as a reference signal). In some cases, the UE may indicate a PRG size for the second signal that corresponds to equivalent channel estimations for the first signal and the second signal. The base station may transmit the second signal using a PRG size based on the feedback message. In some examples, the PRG size of the second signal may be the indicated PRG size, or may be a PRG size determined at the base station based on other parameters included in the feedback message.

A method for wireless communications at a first wireless device is described. The method may include receiving a first signal from a second wireless device, identifying a first bundle size for a precoding resource block group based on a characteristic of the first signal, and transmitting, to the second wireless device, a feedback message indicating a second bundle size for the precoding resource block group associated with a second signal based on identifying the first bundle size.

An apparatus for wireless communications at a first wireless device is described. The apparatus may include a processor, memory coupled with the processor, and instructions stored in the memory. The instructions may be executable by the processor to cause the apparatus to receive a first signal from a second wireless device, identify a first bundle size for a precoding resource block group based on a characteristic of the first signal, and transmit, to the second wireless device, a feedback message indicating a second bundle size for the precoding resource block group associated with a second signal based on identifying the first bundle size.

Another apparatus for wireless communications at a first wireless device is described. The apparatus may include means for receiving a first signal from a second wireless device, means for identifying a first bundle size for a precoding resource block group based on a characteristic of the first signal, and means for transmitting, to the second wireless device, a feedback message indicating a second bundle size for the precoding resource block group associated with a second signal based on identifying the first bundle size.

A non-transitory computer-readable medium storing code for wireless communications at a first wireless device is described. The code may include instructions executable by a processor to receive a first signal from a second wireless device, identify a first bundle size for a precoding resource block group based on a characteristic of the first signal, and transmit, to the second wireless device, a feedback message indicating a second bundle size for the precoding resource block group associated with a second signal based on identifying the first bundle size.

Some examples of the method, apparatuses, and non-transitory computer-readable medium described herein may further include operations, features, means, or instructions for receiving the second signal on a first set of resources in accordance with the second bundle size, where the first signal includes an unprecoded CSI-RS and the second signal includes a DMRS.

In some examples of the method, apparatuses, and non-transitory computer-readable medium described herein, identifying the first bundle size may include operations, features, means, or instructions for performing channel estimation on the first signal based on receiving the first signal on a second set of resources associated with the first bundle size, where the first bundle size may be identified based on the channel estimation.

Some examples of the method, apparatuses, and non-transitory computer-readable medium described herein may further include operations, features, means, or instructions for identifying the second bundle size according to a mapping between the first bundle size and the second bundle size.

In some examples of the method, apparatuses, and non-transitory computer-readable medium described herein, identifying the first bundle size may include operations, features, means, or instructions for performing a set of multiple channel estimations on the first signal using a set of multiple candidate bundle sizes, the method further including and selecting the second bundle size from the set of multiple candidate bundle sizes based on a channel estimation from the set of multiple channel estimations.

Some examples of the method, apparatuses, and non-transitory computer-readable medium described herein may further include operations, features, means, or instructions for transmitting, as part of the feedback message, an indication of a subset of bundle sizes from the set of multiple candidate bundle sizes, an indication of a subset of channel estimation parameters corresponding to the subset of bundle sizes, or a combination thereof.

Some examples of the method, apparatuses, and non-transitory computer-readable medium described herein may further include operations, features, means, or instructions for receiving the second signal on a first set of resources in accordance with the second bundle size, where the first signal includes an unprecoded CSI-RS and the second signal includes a precoded CSI-RS.

Some examples of the method, apparatuses, and non-transitory computer-readable medium described herein may further include operations, features, means, or instructions for selecting the second bundle size may be based on a mapping between the first bundle size and the second bundle size.

Some examples of the method, apparatuses, and non-transitory computer-readable medium described herein may further include operations, features, means, or instructions for receiving control signaling indicating a set of multiple bundle sizes, where performing the set of multiple channel estimations may be based on receiving the control signaling.

In some examples of the method, apparatuses, and non-transitory computer-readable medium described herein, identifying the first bundle size may include operations, features, means, or instructions for receiving the first signal on a set of multiple resources, where each resource of the set of multiple resources may be configured with at least one respective candidate bundle size of a set of multiple candidate bundle sizes, performing a set of multiple channel estimations on the first signal using the set of multiple candidate bundle sizes based on receiving the first signal on the set of multiple resources, the method further including, and selecting the second bundle size from the set of multiple candidate bundle sizes based on a channel estimation from the set of multiple channel estimations.

Some examples of the method, apparatuses, and non-transitory computer-readable medium described herein may further include operations, features, means, or instructions for transmitting, as part of the feedback message, an indication of a resource of the set of multiple resources associated with the second bundle size, an indication of a subset of resources of the set of multiple resources, or a combination thereof.

Some examples of the method, apparatuses, and non-transitory computer-readable medium described herein may further include operations, features, means, or instructions for receiving the second signal on a first set of resources in accordance with the second bundle size, where the first signal includes a precoded CSI-RS and the second signal includes a precoded CSI-RS or a DMRS.

Some examples of the method, apparatuses, and non-transitory computer-readable medium described herein may further include operations, features, means, or instructions for receiving control signaling indicating a report configuration for the feedback message and transmitting the feedback message in accordance with the report configuration.

In some examples of the method, apparatuses, and non-transitory computer-readable medium described herein, the feedback message may be transmitted based on a trigger being satisfied.

In some examples of the method, apparatuses, and non-transitory computer-readable medium described herein, the feedback message may be a HARQ message, a CSI feedback message, or a scheduled feedback message.

In some examples of the method, apparatuses, and non-transitory computer-readable medium described herein, the first signal and the second signal may be sidelink signals.

A method for wireless communications at a first wireless device is described. The method may include transmitting a first signal to a second wireless device, receiving, from the second wireless device, a feedback message indicating a first bundle size for a precoding resource block group associated with a second signal, the first bundle size based on a second bundle size associated with the first signal, and transmitting, to the second wireless device, the second signal based on the feedback message.

An apparatus for wireless communications at a first wireless device is described. The apparatus may include a processor, memory coupled with the processor, and instructions stored in the memory. The instructions may be executable by the processor to cause the apparatus to transmit a first signal to a second wireless device, receive, from the second wireless device, a feedback message indicating a first bundle size for a precoding resource block group associated with a second signal, the first bundle size based on a second bundle size associated with the first signal, and transmit, to the second wireless device, the second signal based on the feedback message.

Another apparatus for wireless communications at a first wireless device is described. The apparatus may include means for transmitting a first signal to a second wireless device, means for receiving, from the second wireless device, a feedback message indicating a first bundle size for a precoding resource block group associated with a second signal, the first bundle size based on a second bundle size associated with the first signal, and means for transmitting, to the second wireless device, the second signal based on the feedback message.

A non-transitory computer-readable medium storing code for wireless communications at a first wireless device is described. The code may include instructions executable by a processor to transmit a first signal to a second wireless device, receive, from the second wireless device, a feedback message indicating a first bundle size for a precoding resource block group associated with a second signal, the first bundle size based on a second bundle size associated with the first signal, and transmit, to the second wireless device, the second signal based on the feedback message.

In some examples of the method, apparatuses, and non-transitory computer-readable medium described herein, transmitting the second signal may include operations, features, means, or instructions for transmitting the second signal on a first set of resources in accordance with the first bundle size, where the first signal includes an unprecoded CSI-RS and the second signal includes a DMRS.

Some examples of the method, apparatuses, and non-transitory computer-readable medium described herein may further include operations, features, means, or instructions for receiving, as part of the feedback message, an indication of a set of bundle sizes including the first bundle size, an indication of a set of channel estimation parameters for the first signal corresponding to the set of bundle sizes, or a combination thereof and transmitting the second signal on a first set of resources in accordance with a bundle size of the set of bundle sizes based on the feedback message, where the first signal includes an unprecoded CSI-RS and the second signal includes a precoded CSI-RS.

Some examples of the method, apparatuses, and non-transitory computer-readable medium described herein may further include operations, features, means, or instructions for transmitting control signaling indicating a set of multiple bundle sizes including at least the set of bundle sizes, where receiving the feedback message may be based on transmitting the control signaling.

In some examples of the method, apparatuses, and non-transitory computer-readable medium described herein, transmitting the first signal may include operations, features, means, or instructions for transmitting the first signal on a set of multiple resources, where each resource of the set of multiple resources may be configured with at least one respective candidate bundle size of a set of multiple candidate bundle sizes, the set of multiple candidate bundle sizes including the first bundle size.

Some examples of the method, apparatuses, and non-transitory computer-readable medium described herein may further include operations, features, means, or instructions for receiving, as part of the feedback message, an indication of a resource of the set of multiple resources associated with the first bundle size, an indication of a subset of resources of the set of multiple resources, or a combination thereof.

Some examples of the method, apparatuses, and non-transitory computer-readable medium described herein may further include operations, features, means, or instructions for transmitting the second signal on a first set of resources in accordance with the first bundle size, where the first signal may be a precoded CSI-RS and the second signal may be a precoded CSI-RS or a DMRS.

Some examples of the method, apparatuses, and non-transitory computer-readable medium described herein may further include operations, features, means, or instructions for transmitting control signaling indicating a report configuration for the feedback message and receiving the feedback message in accordance with the report configuration.

In some examples of the method, apparatuses, and non-transitory computer-readable medium described herein, the feedback message may be a HARQ message, a CSI feedback message, or a scheduled feedback message.

In some examples of the method, apparatuses, and non-transitory computer-readable medium described herein, the first signal and the second signal may be sidelink signals.

6

Figure 3:
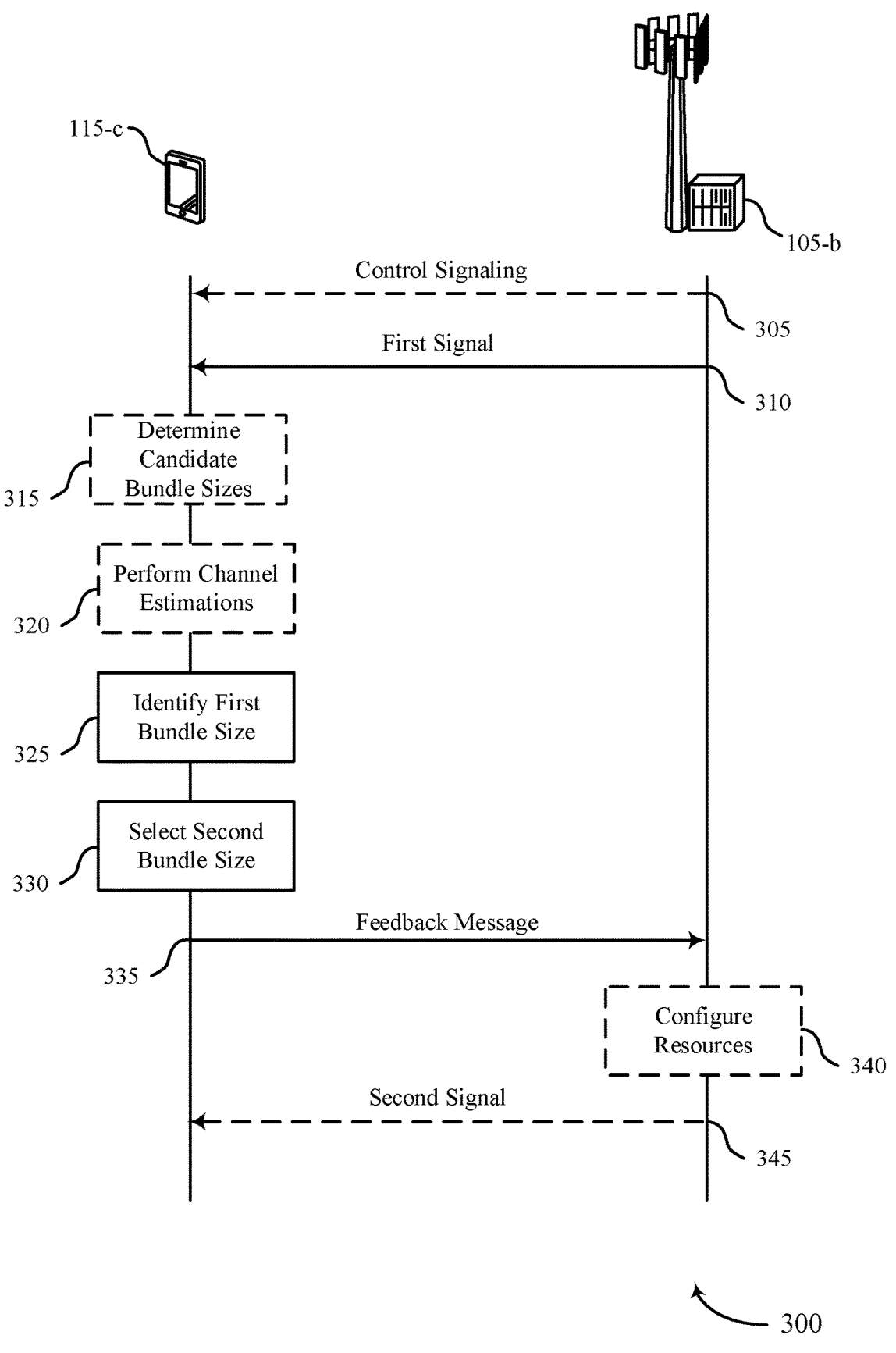
Figure 4:
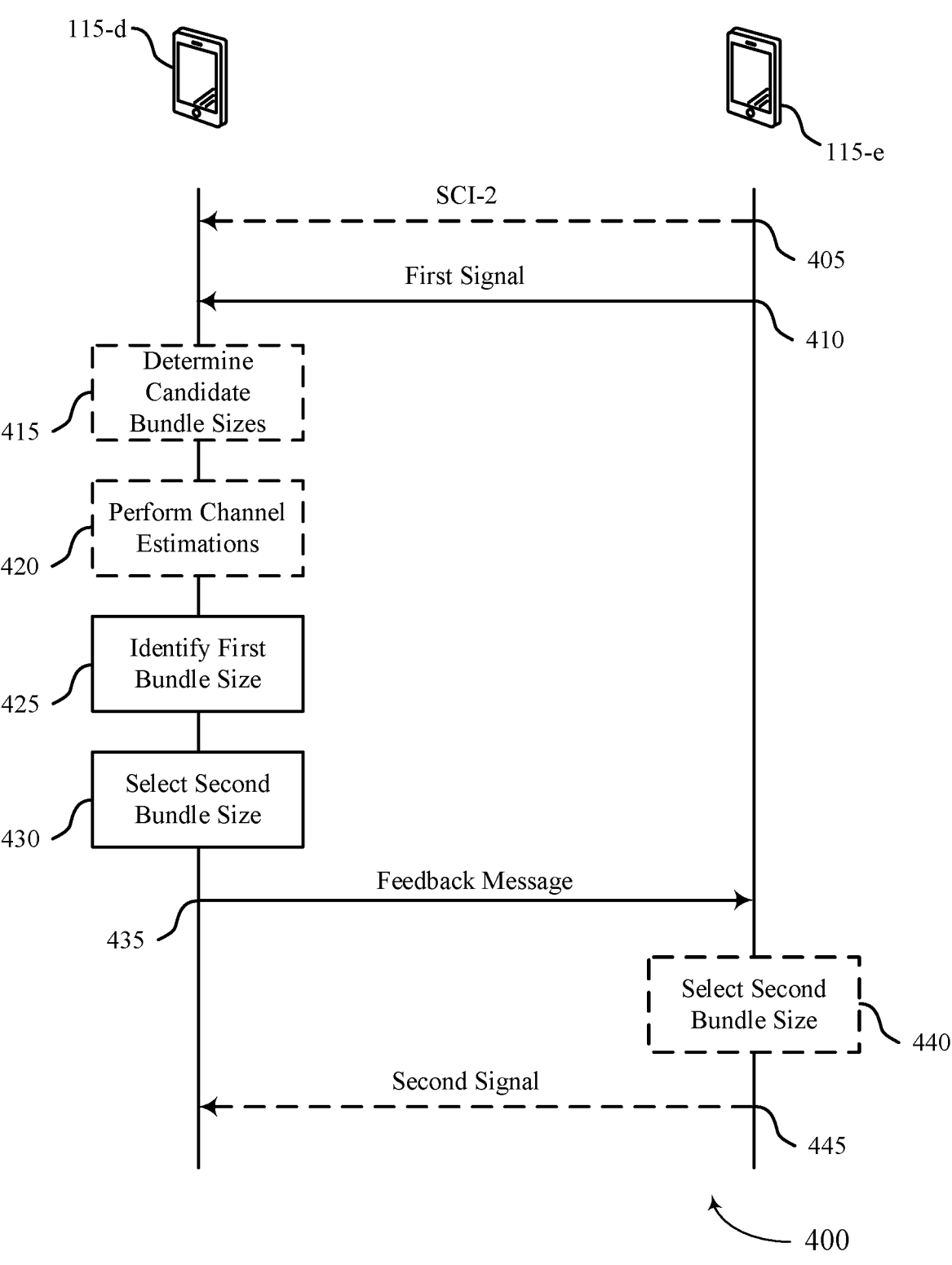

FIGS. 3 and 4 illustrate examples of process flows that support bundle size reporting for PRGs in accordance with aspects of the present disclosure.

Figure 5:
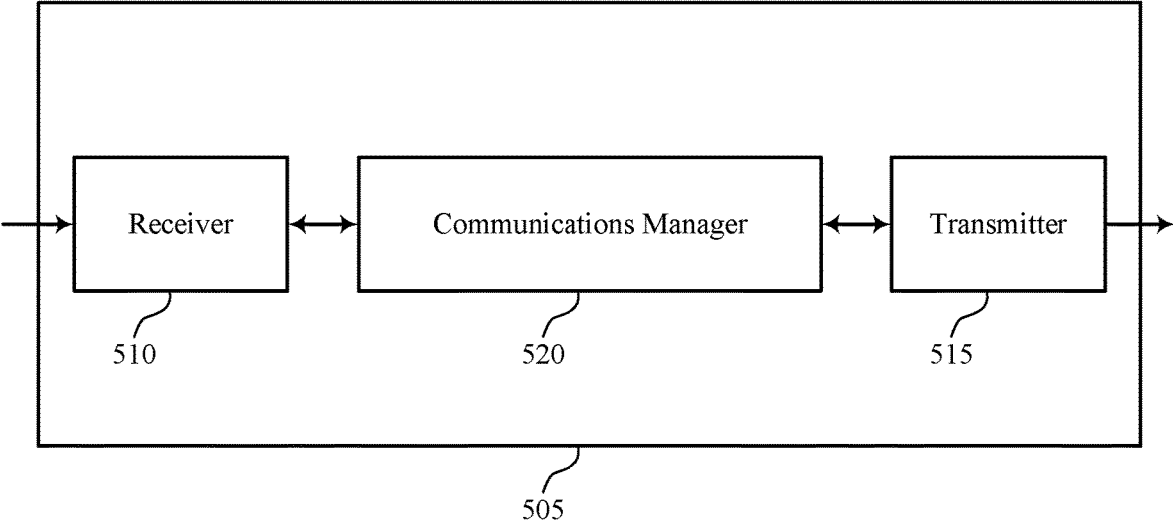
Figure 6:
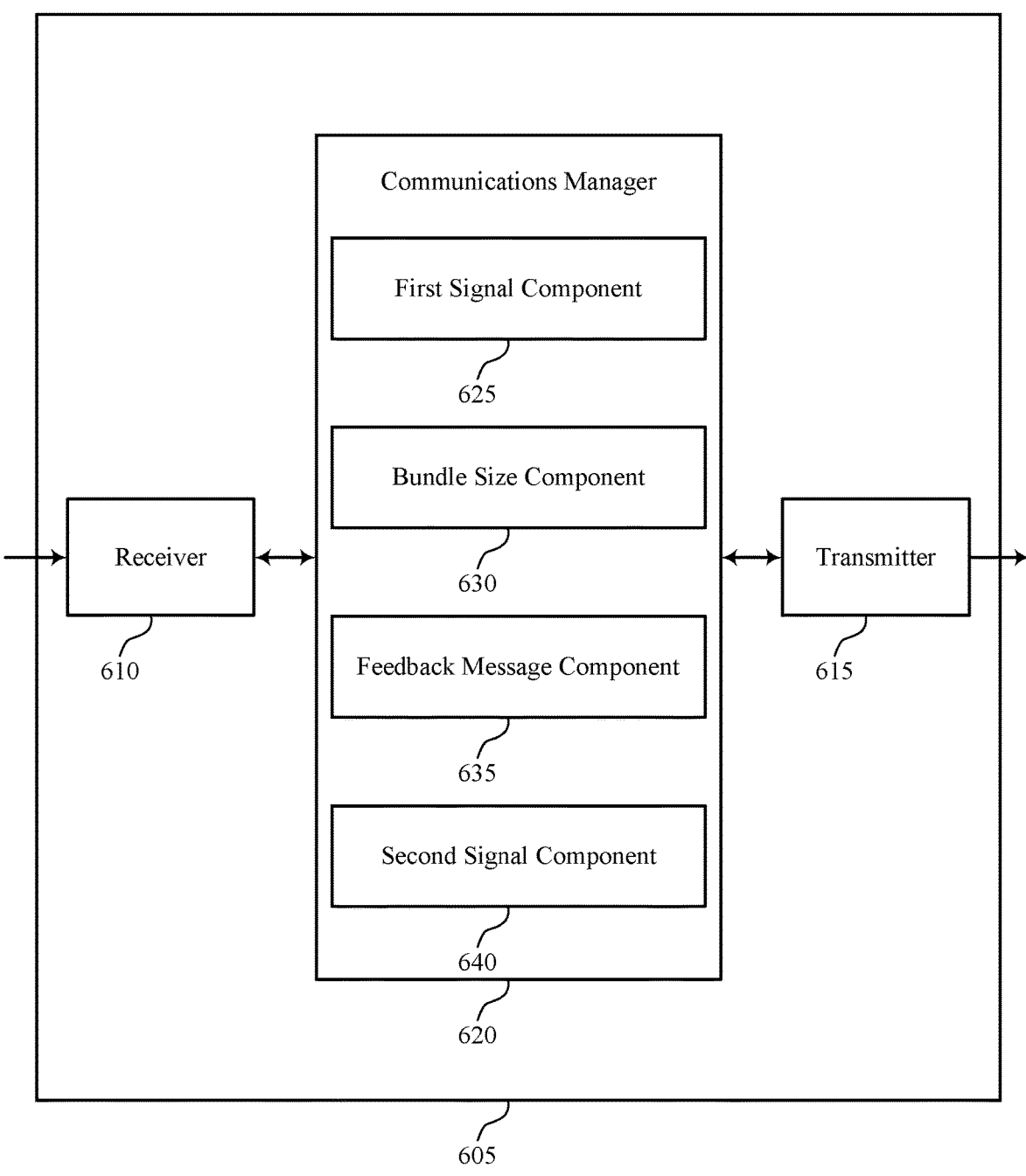

FIGS. 5 and 6 show block diagrams of devices that support bundle size reporting for PRGs in accordance with aspects of the present disclosure.

Figure 7:
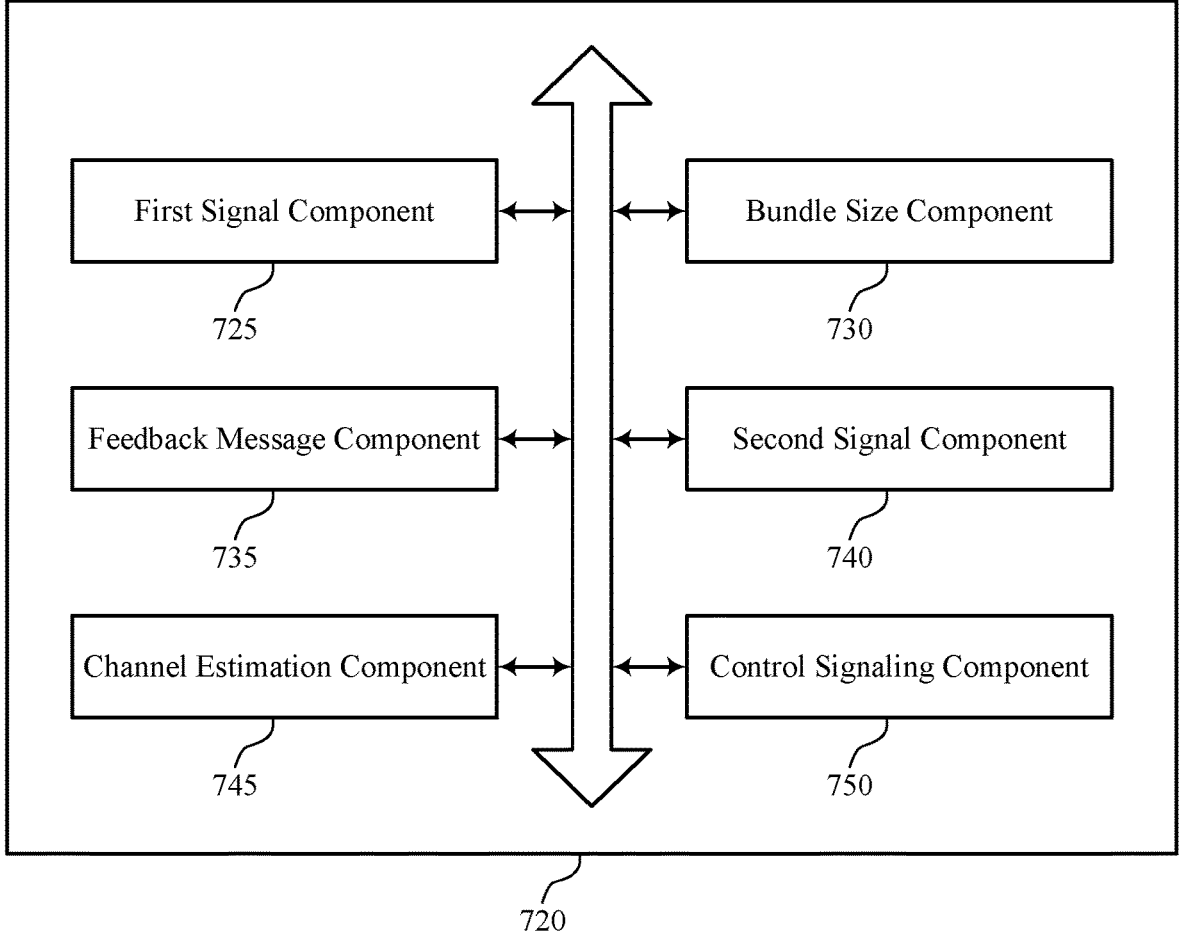

FIG. 7 shows a block diagram of a communications manager that supports bundle size reporting for PRGs in accordance with aspects of the present disclosure.

Figure 8:
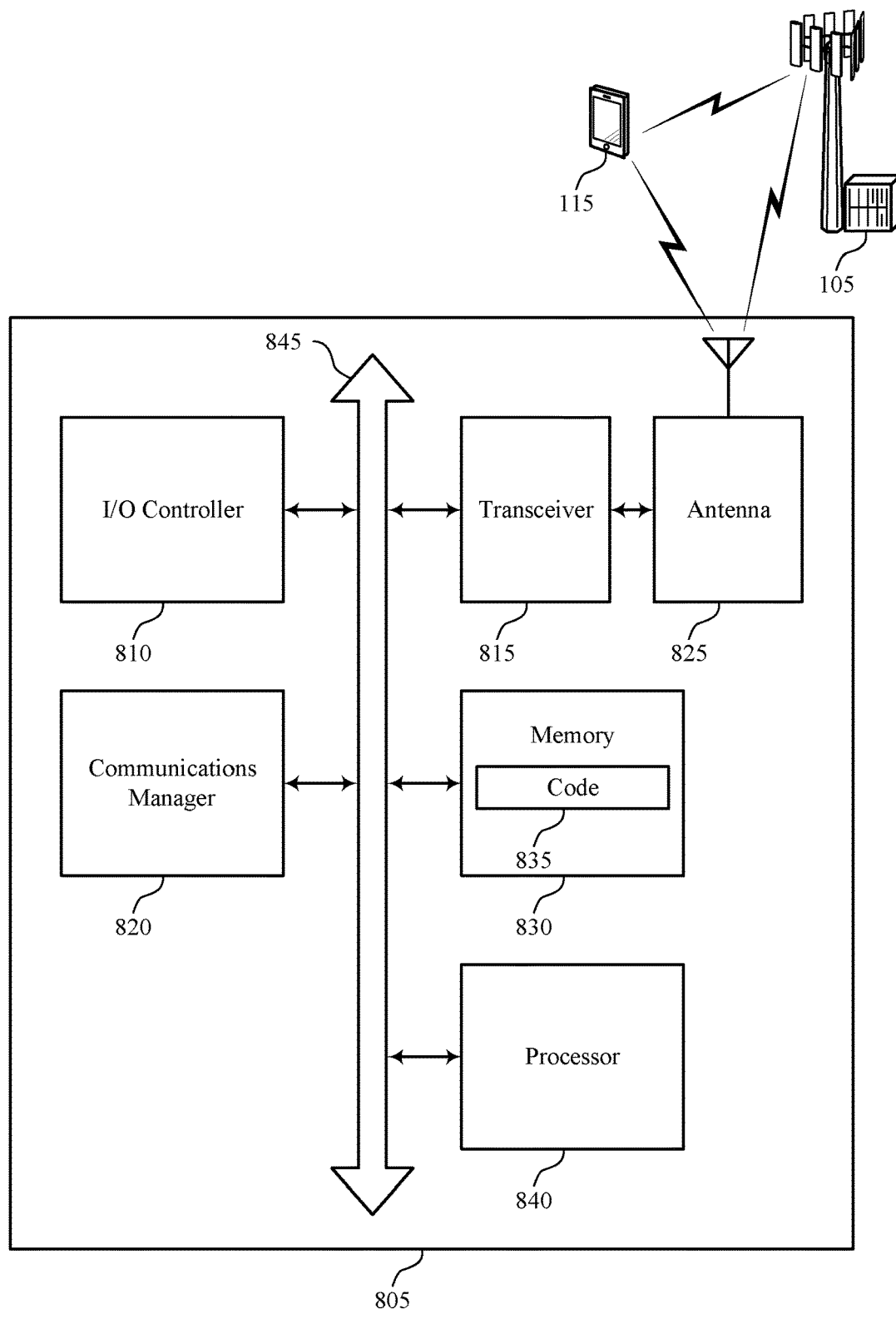

FIG. 8 shows a diagram of a system including a UE that supports bundle size reporting for PRGs in accordance with aspects of the present disclosure.

Figure 9:
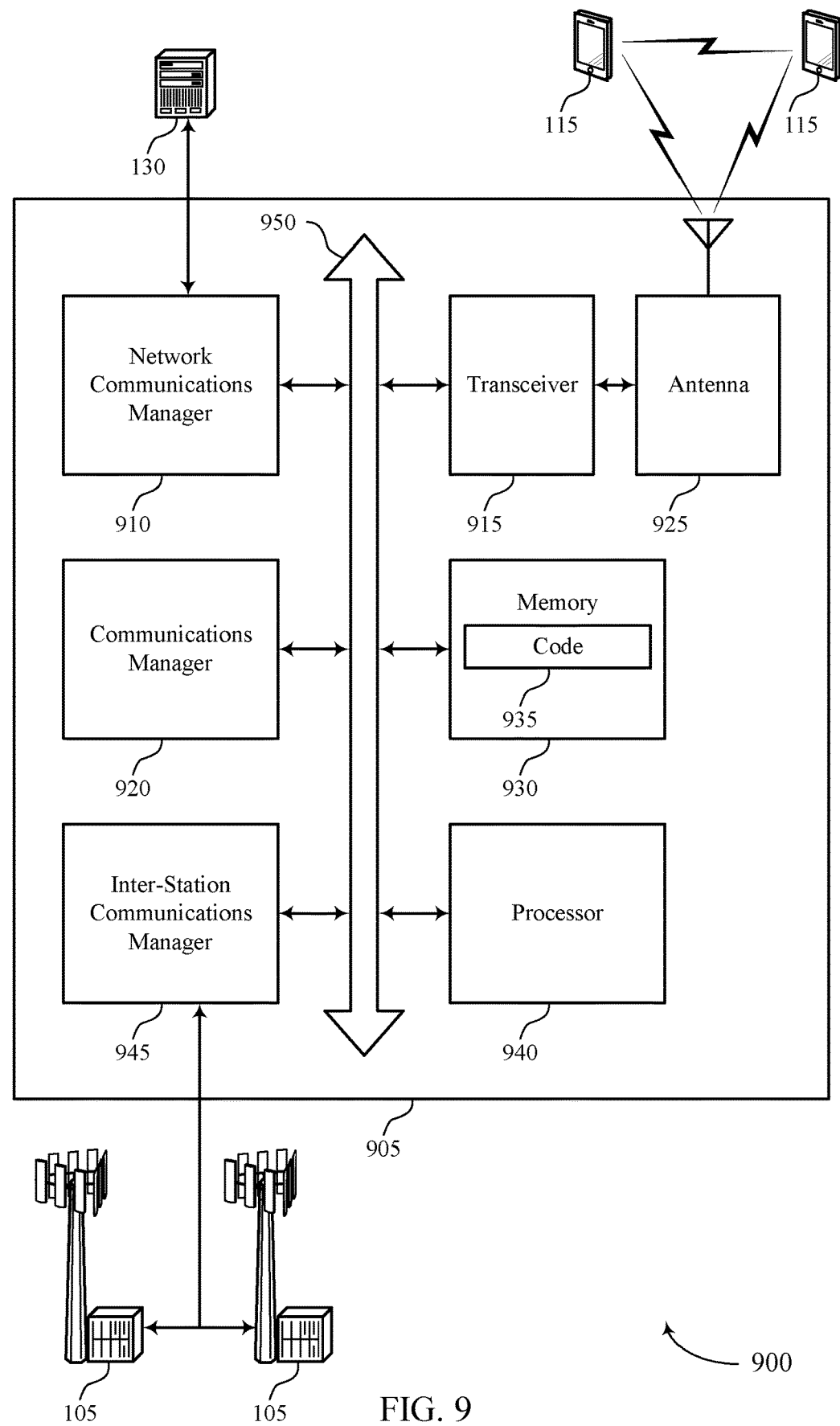

FIG. 9 shows a diagram of a system including a base station that supports bundle size reporting for PRGs in accordance with aspects of the present disclosure.

FIGS. 10 through 13 show flowcharts illustrating methods that support bundle size reporting for PRGs in accordance with aspects of the present disclosure.

DETAILED DESCRIPTION

In a wireless communications system, a base station may apply a precoding matrix to a set of reference signals, and the reference signals may be configured on a set of resources, such as resource blocks. In some cases, the base station may apply the same precoder across the entire transmission bandwidth in a downlink transmission. In other examples, different precoders may be used for the transmission of reference signals within partial bandwidths (e.g., parts of a wideband system bandwidth). In cases where reference signals are transmitted using different precoding, a set of resources including reference signals having a same precoding may be included in a precoding resource group (PRG) (which may also be referred to herein as a physical resource block group), and a size of the PRG (i.e., a bundle size) may refer to a quantity of resource blocks for which the precoding is the same. The base station may configure a PRG size for transmitting one or more reference signals: in some cases, the configured PRG size may be based on sounding reference signals (SRSs) received from a user equipment (UE). The UE may receive the one or more reference signals from the base station and may perform channel estimation in accordance with the PRG size and transmit channel state information (CSI) to the base station.

However, in some examples, a transmitting device (e.g., the base station in some links and a UE in sidelink) may not be capable of selecting a PRG size that supports improved performance at a receiving device (e.g., the UE in both sidelink and other links). For instance, channel characteristics identified at the base station may not be accurately representative of channel characteristics at the UE. That is, characteristics of an uplink channel may not be reciprocal with a downlink channel or vice-versa, and a PRG configured at the base station may not provide accurate channel estimation at the UE. Additionally, some reference signals, such as CSI reference signals (CSI-RSs), may not be precoded: channel estimation for a CSI-RS may be different than, for instance, than channel estimation for a demodulation reference signal (DMRS) having a given PRG size. In these examples, mismatched channel estimation parameters (e.g., channel quality indicator (CQI), rank indicator (RI), precoding matrix indicator (PMI)) may result in inefficient communication parameter (e.g., modulation and coding scheme (MCS), precoding) selection at the base station, which may in turn degrade performance, reduce throughput.

The techniques described herein support a receiving device selecting and reporting a recommended PRG size for a subsequent transmission, for instance, based on channel estimation at the receiving device, which may improve PRG selection at a transmitting device. For example, a UE may receive, from a base station, a first signal, such as a first reference signal (e.g., CSI-RS). The UE may estimate or otherwise identify a first PRG size for a PRG based on a characteristic of the first signal. In some cases, the UE may identify the first PRG size based on performing channel estimation on the first signal. The UE may transmit a feedback message to the base station based on identifying the first PRG size, where the feedback message includes an indication of a second PRG size for the PRG associated with a second signal (e.g., CSI-RS, DMRS, or the like). The base station may transmit the second signal using a PRG size based on the feedback message.

In some examples, the UE may select the second PRG size to indicate in the feedback message from a set of PRG sizes. For instance, the UE may perform channel estimation on the first signal using multiple candidate PRG sizes, and may select the second PRG size from the candidate PRG sizes based on a corresponding channel estimation. Here, performing channel estimation using the multiple candidate PRG sizes may enable the UE to determine which of the PRG sizes may provide a highest channel quality: subsequent signals (including the second signal) transmitted using this PRG size may be associated with improved reliability and performance. In some cases, the feedback message may include an indication of multiple PRG sizes and/or corresponding channel estimation parameters. In such cases, the base station may select a PRG size for the second signal from the multiple PRG sizes, based on the channel estimation parameters, or both.

Aspects of the disclosure are initially described in the context of wireless communications systems. Aspects of the disclosure are then illustrated with respect to process flows. Aspects of the disclosure are further illustrated by and described with reference to apparatus diagrams, system diagrams, and flowcharts that relate to bundle size reporting for precoding resource block groups.

Figure 1:
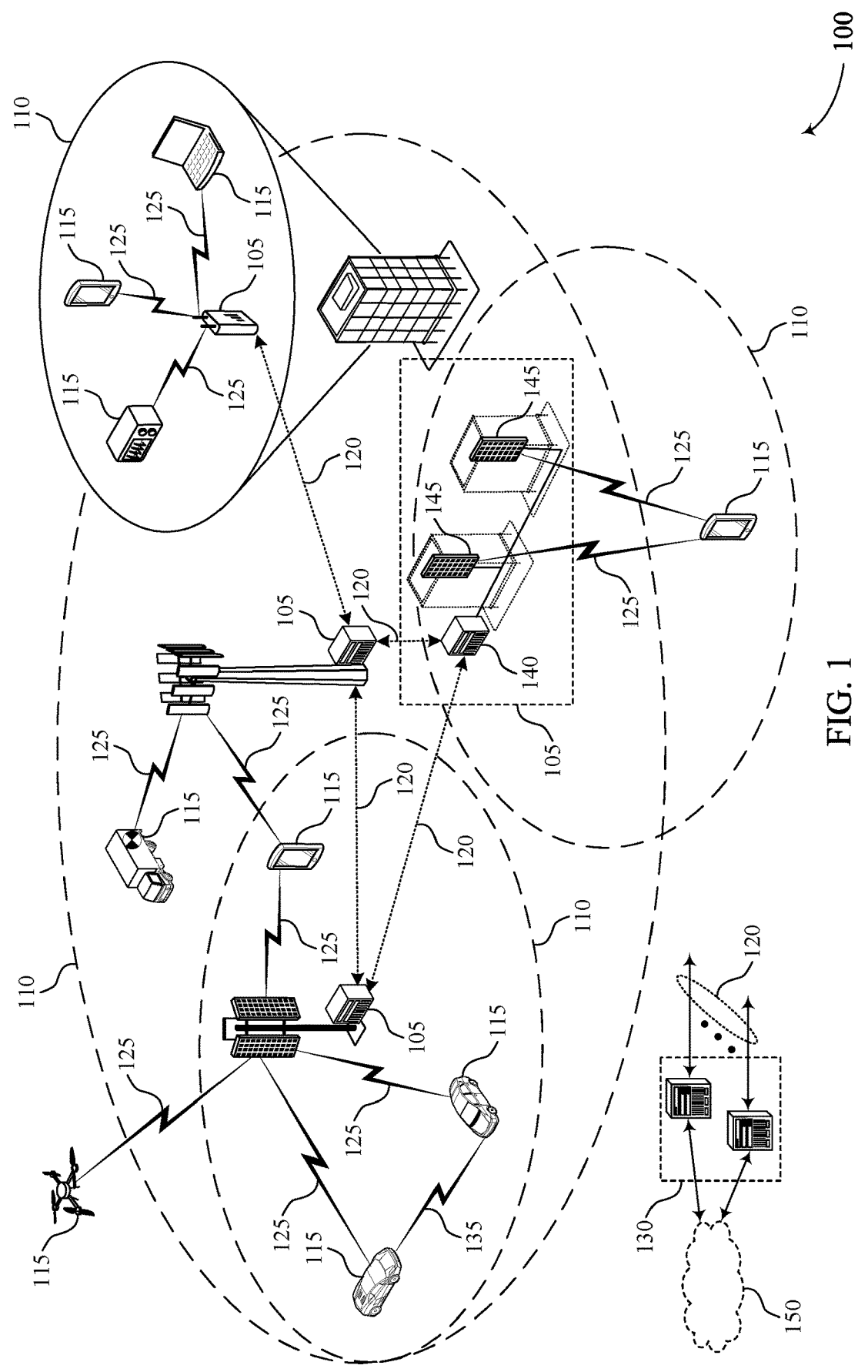
FIGS. 1 and 2 illustrate examples of wireless communications systems that support bundle size reporting for precoding resource groups (PRGs) in accordance with aspects of the present disclosure.

FIG. 1 illustrates an example of a wireless communications system 100 that supports bundle size reporting for PRGs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI)

may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 and a base station 105 may communicate over a communication link 125. In some implementations, the UE 115 may perform one or more channel measurements of the communication link 125 between the UE 115 and the base station 105 to determine a channel quality associated with the communication link 125. For instance, the base station 105 may transmit one or more CSI-RSs to the UE 115 for the UE 115 to use in determining a channel estimate that is used to assist in link adaptation. The UE 115 may perform one or more channel measurements (e.g., CSI measurements) based on the one or more received CSI-RSs and may transmit a CSI report to the base station 105. Based on the CSI report, the UE 115, the base station 105, or both, may adapt transmission parameters to maintain a reliable communication link between the UE 115 and the base station 105.

In some examples, the CSI report may include one or more parameters based on the CSI measurements. For instance, the CSI report may include one or more precoding matrix indicators (PMIs), rank indicators (RIs), layer indicators (LIs), channel quality indicators (CQIs), reference signal received power (RSRP) measurements (e.g., Layer 1-RSRPs (L1-RSRPs)), signal to interference plus noise (SINR) measurements (e.g., L1-SINRs), or the like. The base station 105 may schedule downlink data transmissions to the UE 115 based on and in accordance with the reported parameters. A PMI may indicate, for example, a codebook (e.g., a precoding matrix) of a codebook type selected by the UE 115 for subsequent communications with the base station 105; an RI may indicate a quantity of layers (i.e., a rank) associated with a maximum signal-to-interference-plus-noise ratio (SINR); a CQI may indicate an appropriate MCS for channel conditions. The base station 105 may apply a precoding matrix to and select a quantity of layers and an MCS for a downlink transmission to the UE 115 based on the PMI, RI, and CQI, respectively.

In some examples, the base station 105 may transmit control signaling, such as a radio resource control (RRC)

message, that indicates a CSI report configuration (e.g., CSI-ReportConfig). The CSI report configuration may indicate a configured set of CSI measurement resources, as well as any other resource settings that the UE 115 may select and use to generate a CSI report based on channel and interference measurements performed in accordance with the selected resource setting. For instance, the base station 105 may configure a set of CSI measurement resources, such as CSI-RS resources, and the UE 115 may perform the one or more channel measurements over one or more of the configured set of CSI measurement resources. In some examples, the UE 115 may perform periodic CSI reporting (e.g., the base station 105 may transmit higher layer signaling scheduling periodic CSI reports), aperiodic CSI reporting (e.g., the base station 105 may dynamically configure a CSI report), semi-persistent CSI reporting (e.g., the base station 105 may transmit higher layer signaling scheduling periodic CSI reports and may use dynamic signaling to trigger the periodic CSI reporting), or a combination thereof.

The wireless communications system 100 may support the transmission of a set of precoded reference signals, such as CSI-RS, DMRS, or the like, and using a PRG size (i.e., bundle size) associated with the resources carrying the set of reference signals for the channel estimation at a UE 115. For example, a base station 105 may apply a precoding matrix to a set of reference signals, and the reference signals may be configured on a set of RBs. The RBs including these reference signals may have a same precoding and may be included in a PRG, as the RBs may have similar channel covariance matrices. Here, the base station 105 may average covariance matrices across the RBs to find a singular value decomposition (SVD) to use in applying the precoding. A size of the PRG may refer to a number of RBs (e.g., subcarriers) for which the precoding is the same, i.e., a precoder is fixed for each subcarrier in the PRG. A PRG size may also be referred to as a bundle size (e.g., a bundle size for a physical resource block group, also referred to as a physical resource block (PRB) bundle size)

In some examples, the base station 105 may indicate a PRG size to the UE 115, e.g., via control signaling. For instance, the base station 105 may configure a PRG size for downlink data transmissions and/or reference signals and indicate the PRG size as part of RRC signaling. The UE 115 may perform channel estimation on a received reference signal in accordance with the PRG size. A PRG size may vary according to one or more PRG size configurations, and a PRG size may refer to a precoding granularity. For example, a first PRG configuration may have a granularity of two RBs, whereas a second PRG configuration may have a granularity of four RBs.

A reference signal transmitted using a PRG size may provide improved accuracy and performance in channel estimation as compared to a wideband reference signal. That is, channel measurements performed on a subset of frequency resources (i.e., RBs) may provide relatively more accurate channel estimation parameters than channel measurements performed over a relatively wide frequency band. Additionally, in some examples, narrow band and wideband channel estimation may result in different channel estimation parameters for a same channel. For example, some CSI-RSs may not be precoded at the base station 105, and the UE 115 may perform wideband channel estimation (e.g., channel estimation over a full frequency band). In contrast, the UE 115 may perform narrow band channel estimation for a DMRS having a PRG size. Channel estimation parameters based on the CSI-RS may differ from those based on the DMRS.

In some cases, the UE 115 may assume a PRG to use for channel estimation for a received CSI-RS. For instance, the CSI report configuration (e.g., CSIReportConfig) may indicate a PRG size (e.g., a PRB bundling size) for the UE 115 to use in calculating some parameters, such as CQI. When a higher layer parameter reportQuantity may be set to "cri-RI-i1-CQI", a higher layer parameter pdsch-Bundle-SizeForCSI may indicate the PRG size for CQI calculation. The UE 115 may perform channel measurements on the CSI-RS and determine channel estimation parameters including the CQI assuming the indicated PRG size. That is, although the CSI-RS may not be precoded with a PRG size, the UE 115 may improve accuracy and performance in channel estimation by avoiding wideband channel estimation.

However, when a PRG size is configured by a transmitting device (e.g., a base station 105, a UE 115), whether for a transmitted reference signal (e.g., a DMRS) or for use in calculations (e.g., indicated by pdsch-BundleSizeForCSI), the PRG size identified by the receiving device (e.g., UE 115) may not provide adequate channel estimation at a receiving device (e.g., a UE 115). That is, the receiving device may experience interference, blockage, or the like, that is unseen or unknown at the transmitting device. For example, the transmitting device may assume channel reciprocity in selecting a PRG size, but the channel may not be reciprocal. Accordingly, channel information reported by the receiving device may not be fully representative of channel conditions, and transmission parameters (e.g., MCS, rank, among other examples) determined by the transmitting device based on the report may be suboptimal. In some examples, such suboptimal transmission parameters may degrade performance, reduce efficiency, and decrease reliability in communications between the transmitting device and the receiving device.

Various aspects of the techniques described herein may provide improved channel estimation, and increased communications performance, by enabling a device (e.g., a UE 115, a base station 105) receiving reference signals to identify, select, and recommend one or more PRG sizes to use by a transmitting device (e.g., a UE 115, a base station 105). For example, a first wireless device may receive a first signal from a second wireless device. The first wireless device may determine or otherwise identify a PRG size for the first signal based on a characteristic of the first signal, e.g., based on performing channel estimation on the first signal. The first wireless device may transmit a feedback message to the second wireless device based on identifying the first PRG size, where the feedback message includes an indication of a second PRG size for the PRG associated with a second signal (e.g., CSI-RS, DMRS, or the like). The second wireless device may transmit the second signal using a PRG size based on the feedback message.

In some examples, the first wireless device may select the second PRG size to indicate in the feedback message from a set of PRG sizes. For instance, the first wireless device may perform channel estimation on the first signal using multiple candidate PRG sizes, and may select the second PRG size from the candidate PRG sizes based on a corresponding channel estimation. That is, the first wireless device may select a second PRG size that corresponds to one or more channel estimation parameters that indicate a relatively high channel quality. In some cases, the feedback message may include an indication of multiple PRG sizes and/or corresponding channel estimation parameters.

In any case, the second wireless device may select a PRG size for the second signal based on the feedback message, e.g., based on the indicated second PRG size, the indication of the multiple PRG sizes, the indication of the channel estimation parameters, or some combination thereof. Put another way, using the feedback message, the second wireless device may select a PRG size that accounts for channel conditions at the first wireless device, which may, in turn, improve reliability and performance in communicating the second signal.

While the examples described herein may generally relate to a first wireless device and a second wireless device, the methods and techniques may be similarly applied to any combination of wireless devices in any type of wireless communications system. For example, various aspects of the present disclosure may be implemented by one or more sidelink devices (e.g., UEs 115, vehicles, RSUs, etc.) communicating via one or more sidelink communication links (e.g., D2D communication links 135, V2X communication links, etc.). In such examples, the first signal, the second signal, and the feedback message may be examples of a sidelink signals transmitted over sidelink channels, such as physical sidelink shared channels (PSSCHs), physical sidelink control channels (PSCCHs), physical sidelink feedback channels (PSFCH), or a combination thereof.

Figure 2:
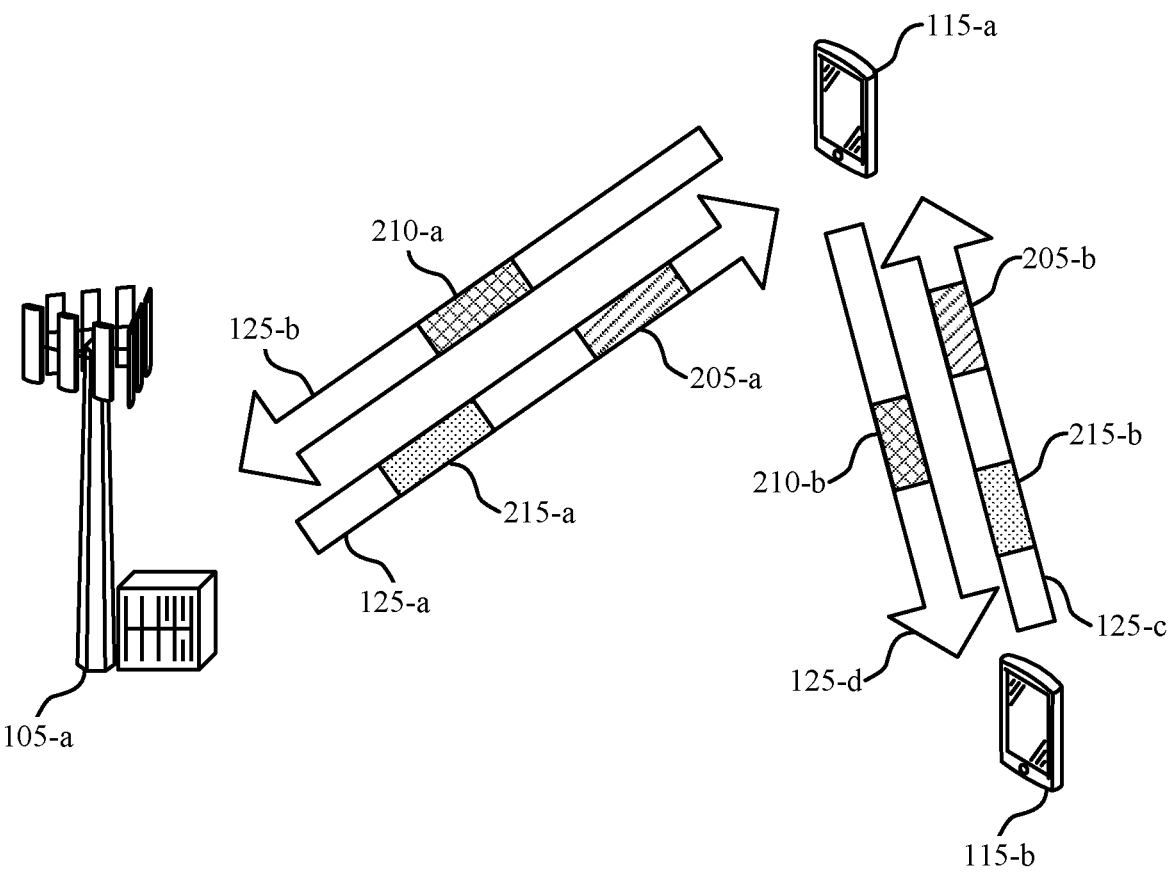

FIG. 2 illustrates an example of a wireless communications system 200 that supports bundle size reporting for PRGs in accordance with aspects of the present disclosure. In some examples, wireless communications system 200 may implement aspects of wireless communications system 100. For instance, wireless communications system 200 includes a UE 115-a, a UE 115-b, and a base station 105-a, which may be examples of the corresponding devices described with reference to FIG. 1. Additionally or alternatively, the UEs 115 may be examples of a CPE, a relay node, a repeater, a router, an IAB node, or the like. Similarly, the base station 105-a may be an example of a backhaul node, an IAB node, or the like. Thus, although aspects of the present disclosure are described with reference to UEs 115 and a base station 105, it is understood that the described techniques may be performed by a wireless device different from UEs 115 and a base station 105. Stated another way, operations performed by the UEs 115 and the base station 105-a may be respectively performed by a UE 115, a base station 105, or another wireless device, and the example shown is not to be construed as limiting.

The base station 105-a may communicate with the UE 115-a via an uplink communication link 125-a and a downlink communication link 125-b which may be examples of or include one or more uplink and downlink channels, respectively. The UE 115-a may communicate with the UE 115-b via communication links 125-c and 125-d, which may be examples of sidelink communication links and may include one or more sidelink channels (e.g., PSSCH, PSFCH, PSCCH). As illustrated in FIG. 2, the UE 115-a may be an example of a receiving device, while the UE 115-b and the base station 105-a may be examples of transmitting devices.

In some cases, the quality of a channel may depend on, for instance, the local environment, precoding, interference, or the like, among other examples. Precoding may refer to the application of weighting (e.g., phase shifting, amplitude scaling, etc.) to one or more signals transmitted over a channel such that the superposition of these signals at a receiving device improves the received signal quality (e.g., improves the signal-to-interference and noise ratio (SINR) of a transmission). In order to support efficient scheduling of resources, a transmitting device, such as the base station 105-*a* or the UE 115-*b*, may allocate resources based on an estimate of the quality of different channels used to transmit reference signals.

A transmitting device, such as the base station 105-*a* or the UE 115-*b*, may transmit reference signals (e.g., CSI-RS, DMRS) over a bandwidth of a communication link 125 to facilitate channel estimation and reporting of channel quality information, such as CSI feedback. Reference signal transmissions may enable an estimation of the quality of a channel used to transmit data. In some cases, reference signals may be transmitted over a wide bandwidth (i.e. wideband CSI-RS). In other cases, reference signals may be transmitted on a partial radio frequency band (i.e., partial-band CSI-RS, DMRS). The timing of the reference signal transmissions and corresponding feedback reporting may be controlled by the base station 105-*a*.

The base station 105-*a* may adapt or otherwise control one or more communication parameters to improve channel quality based on feedback reported by the UE 115-*a*. Additionally, in some examples, the base station 105-*a* may determine communication parameters based on an SRS transmitted by the UE 115-*a*. For example, the base station 105-*a* may select a precoder for a downlink transmission (e.g., a downlink data transmission, a downlink reference signal) based on a PMI indicated by the UE 115-*a*. The base station may further determine a PRG size for the downlink transmission based on determining channel information associated with a received SRS.

When the downlink transmission is an example of a reference signal, the UE 115-*a* may bundle RBs (e.g., PRBs) to perform channel estimation. That is, the UE 115-*a* may perform channel estimation across a set of resources (i.e., RBs) having a same precoding (e.g., a PRG) in accordance with the PRG size, which may increase granularity and accuracy in the channel estimation. Accurate channel estimation may enable the base station 105-*a* to optimize communication parameter selection, which may increase reliability and throughput over the channel. Accordingly, channel estimation performance may be improved by transmitting reference signals using an appropriate PRG size. Additionally, channel estimation for a CSI-RS transmitted using a PRG size (e.g., a precoded CSI-RS, a DMRS) may be relatively more accurate, and provide a better representation of a channel, than channel estimation for a wideband CSI-RS.

A PRG size may be recommended by a receiving device, such as the UE 115-*a*, based on channel conditions (e.g., channel estimations) at the receiving device, such that a transmitting device may apply the recommended PRG size to subsequent transmissions to the receiving device and/or determine other communication parameters. For example, the UE 115-*a* may determine a relationship between PRG sizes of a DMRS and a CSI-RS. Put another way, based on a received CSI-RS, the UE 115-*a* may identify a PRG size for a future DMRS that provides equivalent channel estimations for the received CSI-RS and the DMRS. In another example, the UE 115-*a* may identify, based on a received, unprecoded CSI-RS, a PRG size for a future precoded CSI-RS that provides improved performance.

In the example of FIG. 2, the UE 115-*a* may receive a first signal 205-*a* from the base station 105-*a*. The first signal 205-*a* may be an example of a reference signal, such as a precoded CSI-RS, an unprecoded CSI-RS, a DMRS, or the like. The UE 115-*a* may determine a PRG size based on channel estimation of the first signal 205-*a*. That is, the UE 115-*a* may perform one or more channel measurements on the first signal 205-*a* to obtain one or more channel estimation parameters (e.g., CQI, RI, PMI, RSRP, etc.). Then, the UE 115-*a* may determine whether 2 PRBs, 4 PRBs, etc. may be used for downlink channel performance in subsequent transmissions. The UE 115-*a* may transmit a feedback message 210-*a* to the base station 105-*a* that includes an indication of the selected PRG size, such that the base station 105-*a* may transmit a second signal 215-*a* to the UE 115-*a* using the PRG size indicated by the UE 115-*a*.

Additionally, or alternatively, in the example of FIG. 2, the UE 115-*a* may receive a first signal 205-*b* from the UE 115-*b* via the sidelink communication link 125-*c*, where the first signal 205-*b* may be a sidelink signal, such as an unprecoded CSI-RS multiplexed with a PSSCH. The UE 115-*a* may determine a PRG size for a subsequent sidelink transmission (e.g., DMRS, CSI-RS), such as a second signal 215-*b*, and indicate the selected PRG size in a feedback message 210-*b*. In some cases, the UE 115-*a* may transmit the feedback message 210-*b* via a PSFCH, such as a PSFCH associated with the PSSCH (e.g., multiplexed with the first signal 205-*b*), or via a PSSCH. In some examples, if transmitted via PSSCH, the feedback message 210-*b* may be transmitted in resources dedicated (e.g., scheduled) for the feedback message 210-*b* or included as part of a PC5 RRC message or MAC-CE message. The UE 115-*b* may transmit the second signal second signal 215-*b* based on the feedback message 210-*b*, e.g., using the PRG size.

In some examples, selection and indication of the PRG size selected by the UE may depend on the first signal 205, the second signal 215, or both. For example, the first signal 205-*a* may be an unprecoded CSI-RS, and the UE 115-*a* may identify the selected PRG size based on the CSI channel estimation parameters. Additionally, or alternatively, the UE 115-*a* may identify a PRG size based on whether the second signal 215 is a precoded CSI-RS or a DMRS. As an example, a selected PRG size for a subsequent precoded CSI-RS may be different from a selected PRG size for a subsequent DMRS.

For example, a first signal 205 may be an example of an unprecoded CSI-RS and the second signal 215 may be an example of a DMRS. The UE 115-*a* may receive the first signal 205 on a first set of resources. The UE 115-*a* may perform one or more channel estimations on the first signal 205 and may identify a first PRG size for a PRG based on a characteristic of the first signal 205, e.g., as determined by the one or more channel estimations, where the first set of resources may be associated with the first PRG size. The UE 115-*a* may select or otherwise identify a second PRG size for the second signal 215 based on the first PRG size, the one or more channel estimations, the second signal 215, or a combination thereof. For instance, the second PRG size may correspond to a PRG size selected by the UE 115-*a* for a subsequent DMRS (e.g., second signal 215). The UE 115-*a* may transmit the feedback message 210 including the indication of the second PRG size. Based on the feedback message 210, a transmitting device (e.g., the base station 105-*a*, the UE 115-*b*) may transmit the second signal 215 to the UE 115-*a* on a second set of resources in accordance with the second PRG size.

In some cases, the UE 115-*a* may identify a PRG size (e.g., the second PRG size) based on a mapping between the first PRG size of the first signal 205 and the second PRG size of the second signal 215. If the first signal 205 is unprecoded (e.g., unprecoded CSI-RS), the UE 115-*a* may estimate a PRG size or assume (e.g., based on a received indication) the first PRG size: otherwise, the UE 115-*a* may identify the first PRG size based on the first signal 205. The UE 115-*a* may then identify the second PRG size based on a mapping, where the mapping may be based on achieving equivalent channel estimation performance for the first signal 205 and the second signal 215. Here, equivalent channel estimation may be based on a normalized mean square error (NMSE), CQI error, or the like, calculated by the UE 115-*a*. As an explicit, non-limiting example, the mapping may be a function of DMRS configuration, and may indicate that a first PRG size used for channel estimation for the CSI-RS corresponds to a second PRG size for channel estimation for the DMRS (e.g., based on a configuration of the DMRS).

In some examples, the UE 115-*a* may select the second PRG size from a set of candidate PRG sizes based on performing multiple channel estimations using the set of candidate PRG sizes. The UE 115-*a* may be configured with a set of candidate PRG sizes to use. For instance, the set of candidate PRG sizes may be indicated (e.g., by the base station 105-*a* or the UE 115-*b*) via control signaling to the UE 115-*a*, or may be associated with a capability of the UE 115-*a*. As an example, the first signal 205 may be an example of an unprecoded CSI-RS and the second signal 215 may be an example of a precoded CSI-RS. The UE 115-*a* may receive the first signal 205 and perform respective channel estimations on the first signal 205 using each PRG size of the set of candidate PRG sizes. Here, the UE 115-*a* may select a PRG size for the second PRG size based on a corresponding channel estimation having one or more selected channel estimation parameter values. For example, the UE 115-*a* may be configured to select a PRG size corresponding to a highest CQI, such that a precoded CSI-RS transmitted in accordance with the selected PRG size may have an improved channel quality. Additionally, the UE 115-*a* may select the second PRG size based on a mapping between the second PRG size and the first PRG size, e.g., based on the channel estimations. In some cases, the UE 115-*a* may additionally identify and indicate a third PRG size corresponding to a DMRS PRG size, for example, based on a mapping between the second PRG size and the third PRG size.

The UE 115-*a* may indicate, in the feedback message 210, the second PRG size and, in some cases, the one or more corresponding channel estimation parameters. The transmitting device (e.g., the base station 105-*a*, the UE 115-*b*) may transmit the second signal 215 to the UE 115-*a* on a second set of resources in accordance with the second PRG size. In some examples, the UE 115-*a* may additionally select a subset of PRG sizes based on corresponding channel estimations, such as a subset of PRG sizes corresponding to a quantity of channel estimation parameter values. The UE 115-*a* may include, in the feedback message 210, an indication of the subset of PRG sizes, an indication of a subset of corresponding channel estimation parameters, or a combination thereof. In this example, the transmitting device (e.g., the base station 105-*a*, the UE 115-*b*) may select a PRG size to use in transmitting the second signal 215 from among the indicated PRG sizes, e.g., based on the indicated corresponding channel estimation parameters, among other examples.

In some cases, the first signal 205 may be configured with multiple PRG sizes, and the UE 115-*a* may select a PRG size from the multiple PRG sizes. More specifically, the first signal 205 may be an example of a precoded CSI-RS transmitted on a set of resources where each resource of the set of resources is configured with one or more candidate PRG sizes of a set of candidate PRG sizes. In some cases, a single resource of the set of resources may be configured with more than one candidate PRG size of the set of candidate PRG sizes. The UE 115-*a* may perform channel estimation on the first signal 205 using the set of candidate PRG sizes. The UE 115-*a* may select the second PRG size from the set of candidate PRG sizes based on a channel estimation of a corresponding resource of the set of resources. For example, the UE 115-*a* may identify a resource associated with a PRG size that corresponds to one or more selected channel estimation parameter values.

The UE 115-*a* may indicate, in the feedback message 210, the second PRG size and, in some cases, the corresponding resource (e.g., via a resource indication, such as a channel resource indicator (CRI)). The transmitting device (e.g., the base station 105-*a*, the UE 115-*b*) may transmit the second signal 215, which may be an example of a precoded CSI-RS or a DMRS, to the UE 115-*a* on a second set of resources in accordance with the second PRG size. In some examples, the UE 115-*a* may indicate a subset of resources of the first set of resources that correspond to a subset of selected PRG sizes. Accordingly, the transmitting device (e.g., the base station 105-*a*, the UE 115-*b*) may select a PRG size to use in transmitting the second signal 215 based on the indicated subset of resources. That is, the transmitting device may identify a PRG size associated with a resource of the subset of resources, and may configure the second set of resources in accordance with the identified PRG size.

The feedback messages 210 may be transmitted according to a timing, which may be controlled by the respective transmitting devices (e.g., the base station 105-*a*, the UE 115-*b*) and/or indicated to the UE 115-*a* (e.g., via control signaling). For example, the UE 115-*a* may transmit the feedback messages 210 periodically, aperiodically, or semi-persistently, or based on a trigger (e.g., indicated in downlink control information (DCI), such as uplink DCI). Additionally, the feedback messages 210 may be transmitted in accordance with a feedback configuration, which may be indicated to the UE 115-*a* (e.g., via control signaling). In some examples, the feedback configuration may be specific to the type of signal (e.g., second signal 215) associated with the reported PRG size. That is, a feedback configuration for a feedback message that indicates a PRG size for a DMRS may be different from a feedback configuration for a feedback message that indicates a PRG size for a CSI-RS.

The feedback configuration may indicate a resource configuration for a feedback message 210. For instance, the base station 105-*a* may transmit a feedback configuration via RRC signaling that indicates a resource for the UE 115-*a* to use to transmit the feedback message 210. Alternatively, the RRC signaling may indicate a set of resources configured for the UE 115-*a* for transmission of the feedback message 210, and the base station 105-*a* may dynamically indicate (e.g., via MAC-CE, DCI, or the like) one or more resources from the set of resources to the UE 115-*a*. In some cases, the feedback message 210 may be transmitted on resources (e.g., physical uplink control channel (PUCCH) resources, physical uplink shared channel (PUSCH) resources) dedicated (e.g., scheduled) for the feedback message 210.

In other cases, the feedback message 210 may be a HARQ feedback message, a CSI feedback message, or the like, that includes an indication of the selected PRG size. In such cases, the feedback configuration may configure resources for the HARQ feedback message, the CSI feedback message, or the like. Additionally, in such cases, the UE 115-*a* may be configured to perform and transmit PRG reporting in accordance with a timing of the feedback message 210. For example, if the feedback message 210 is a HARQ feedback message, the feedback configuration may indicate a set of resources of the feedback message 210 for PRG size reporting and a set of resources for HARQ feedback. Accordingly, when the UE 115-a is triggered to report HARQ feedback, the UE 115-a may additionally be triggered to report an indication of a PRG size.

In some examples, the feedback configuration may indicate information for the UE 115-a to include in the feedback message, such as a quantity of PRG sizes, one or more channel estimation parameters (e.g., corresponding to one or more PRG sizes), a quantity of resources associated with a quantity of bundle sizes, or the like.

In addition to selecting a PRG size for a second signal 215, based on a feedback message 210, a transmitting device may select, adjust, or otherwise modify communication parameters for communication with the UE 115-a. For example, the base station 105-a may modify configured SRSs at the UE 115-a by inferring channel selectivity based on a selected PRG size: the base station 105-a may select resources and/or a configuration for SRSs that may, in some cases, reduce power consumption at the UE 115-a, improve SRS performance, or the like. More specifically, the base station 105-a may select or modify SRS configurations, select partial frequency SRSs, or adjust a comb level for an SRS, among other examples.

Additionally, or alternatively, the base station 105-a may infer a precoder that provides improved performance based on a channel type (e.g. line of sight (LOS), non-line of sight (NLOS), mixed). The base station 105-a may, in some examples, change a precoder from a non-codebook precoder (e.g., an SVD precoder) to a codebook-based precoder (e.g., Slepian, Legendre, DFT, etc.), such as an LOS precoder.

FIG. 3 illustrates an example of a process flow 300 that supports bundle size reporting for PRGs in accordance with aspects of the present disclosure. In some examples, process flow 300 may implement aspects of wireless communications systems 100 and 200. For example, process flow 300 includes a UE 115-c and a base station 105-b, which may be examples of the corresponding devices described herein. Additionally, the operations in process flow 300 performed by the UE 115-c and the base station 105-b may be respectively performed by a UE 115, a base station 105, or another wireless device, and the example shown should not be construed as limiting.

At 305, the base station 105-b may transmit, and the UE 115-c may receive, control signaling (e.g., RRC signaling, DCI, MAC-CE, or the like). The control signaling may indicate a plurality of bundle sizes (i.e., PRG sizes), a report configuration for a feedback message, or a combination thereof, for the UE 115-c to use in identifying and reporting bundle size information for PRGs. For instance, the control signaling may be an example of an RRC message indicating the report configuration, a DCI or MAC-CE message indicating a set of resources for the feedback message, etc.

At 310, the base station 105-b may transmit, and the UE 115-c may receive, a first signal via a downlink channel, such as a PDSCH, a PDCCH, or the like. The first signal may be an example of a downlink data transmission, control signaling, a reference signal, or a combination thereof. For example, the first signal may be a precoded reference signal, such as a precoded CSI-RS, a DMRS, or the like, among other examples. Alternatively, the first signal may be an unprecoded reference signal, such as an unprecoded CSI-RS. In any case, the UE 115-c may receive the first signal on a first set of resources. In some cases, the first set of resources may be associated with a first bundle size. For example, if the first signal is a precoded signal, the first set of resources may be associated with a bundle size of a PRG associated with the first signal.

In some examples, each resource of the first set of resources may be configured with at least one respective candidate bundle size of a set of candidate bundle sizes. For example, a first resource of the first set of resources may be configured with a first candidate bundle size, a second resource of the first set of resources may be configured with a second candidate bundle size and a third candidate bundle size, and so forth. In some examples, the candidate bundle sizes may be indicated in the control signaling at 305, for instance, as part of the feedback report configuration.

At 315, the UE 115-c may optionally determine a set of candidate bundle sizes. In a first example, the UE 115-c may determine a set of candidate bundle sizes based on receiving an indication of the set of candidate bundle sizes in the control signaling at 305, for instance, as part of the feedback report configuration. In a second example, the set of candidate bundle sizes may correspond to the set of candidate bundle sizes with which the first set of resources of the first signal are configured. In a third example, the UE 115-c may determine a set of candidate bundle sizes for use in channel estimation (e.g., at 320). In some cases, the set of candidate bundle sizes may include bundle sizes associated with a capability of the UE 115-c.

At 320, the UE 115-c may perform one or more channel estimations on the first signal received at 310, and may calculate or otherwise determine one or more channel estimation parameters based on performing the channel estimation(s). For example, the UE 115-c may perform channel estimation on the first signal based on receiving the first signal on the first set of resources. In this example, the first signal may be an example of an unprecoded CSI-RS.

In some cases, the UE 115-c may perform a set of channel estimations on the first signal using a set of candidate bundle sizes, which may be determined at 315. In some examples, the UE 115-c may perform a set of channel estimations on the first signal based on receiving the control signaling at 305 and using the set of candidate bundle sizes indicated in the control signaling. Here, the first signal may be an example of an unprecoded CSI-RS. Additionally, or alternatively, if the UE 115-c receives the first signal on the first set of resources, each resource configured with one or more respective candidate bundle sizes of a set of candidate bundle sizes, the UE 115-c may perform a set of channel estimations on the first signal using the configured candidate bundle sizes (e.g., based on receiving the first signal on the first set of resources). That is, the UE 115-c may perform channel estimation for a first resource of the first set of resources based on the one or more candidate bundle sizes with which the first resource is configured, may perform channel estimation for a second resource of the first set of resources based on the one or more candidate bundle sizes with which the second resource is configured, and so on. In this example, the first signal may be an example of a precoded CSI-RS.

At 325, the UE 115-c may identify a first bundle size for a PRG based on a characteristic of the first signal. For instance, the UE 115-c may identify the first bundle size based on performing channel estimation(s) on the first signal at 320. In some cases, the characteristic of the first signal may be based on (e.g., identified based on) the channel estimation. In some cases, the UE 115-c may identify the first bundle size based on performing the channel estimation(s) at 320 using a set of candidate bundle sizes. In some examples, the set of candidate bundle sizes may include the first bundle size.

At 330, the UE 115-c may select or otherwise identify a second bundle size for the PRG associated with a second signal. In some examples, the UE 115-c may identify the second bundle size based on identifying the first bundle size at 325. For example, the UE 115-c may identify the second bundle size according to a mapping between the first bundle size (e.g., determined at 325) and the second bundle size. In cases where the UE 115-c performs channel estimation(s) at 320 using a set of candidate bundle sizes, the UE 115-c may select the second bundle size from the set of candidate bundle sizes, for instance, based on a channel estimation from a set of channel estimations, a mapping between the first bundle size and the second bundle size, or a combination thereof. In cases where each resource of the first set of resources is configured with a respective one or more candidate bundle sizes, the second bundle size may correspond to a resource of the first set of resources.

For example, when the UE 115-c performs (e.g., at 320) a set of channel estimations on the first signal using a set of candidate bundle sizes, the UE 115-c may select the second bundle size from the set of candidate bundle sizes based on a channel estimation from the set of channel estimations. Here, the channel estimation may be associated with one or more channel estimation parameters indicated by the UE 115-c. That is, the UE 115-c may select the second bundle size based on comparing one or more channel estimation parameters (e.g., RSRP, RSRQ, SINR, CQI, RI, etc.) corresponding to respective channel estimations for each of the candidate bundle sizes. For instance, if a first candidate bundle size is associated with a relatively higher SINR value than a second candidate bundle size, the UE 115-c may select the first candidate bundle size as the second bundle size.

At 335, the UE 115-c may transmit, and the base station 105-b may receive, a feedback message indicating the second bundle size for the PRG associated with the second signal. The feedback message may be an example of a HARQ feedback message, a CSI feedback message, or a PRG feedback message (e.g., a dedicated feedback message for PRG size/bundle size reporting). In some cases, the UE 115-c may transmit the feedback message based on a trigger being satisfied, such as a trigger in uplink DCI. Additionally, or alternatively, the UE 115-c may transmit the feedback message as part of CSI reporting, for instance, when a trigger for a CSI report is satisfied.

The UE 115-c may transmit the feedback message in accordance with a report configuration received via the control signaling at 305. For example, the report configuration may indicate a timing (e.g., periodic, aperiodic, semi-persistent scheduling, or the like) for transmitting the feedback message. The report configuration may also indicate resources on which the UE 115-c may transmit the feedback message, which may be resources dedicated for the feedback message (e.g., resources scheduled for reporting PRG size/bundle size), resources associated with a HARQ/ACK report, resources associated with a CSI feedback report, or the like. The UE 115-c may transmit the feedback message via an uplink channel, such as a PUCCH, a PUSCH, or the like, based on the report configuration.

In some examples, the UE 115-c may transmit, as part of the feedback message, an indication of a subset of bundle sizes from a set of candidate bundle sizes, an indication of a subset of channel estimation parameters corresponding to the subset of bundle sizes, or a combination thereof. For instance, if the UE 115-c performs a set of channel estimations at 320 using a set of candidate bundle sizes, the UE 115-c may select a subset of bundle sizes from the set of candidate bundle sizes based on the corresponding channel estimations. The UE 115-c may include an indication of the selected subset of bundle sizes and the corresponding channel estimation parameters in the feedback message at 335.

Additionally, or alternatively, the UE 115-c may transmit, as part of the feedback message, an indication of a resource of the first set of resources associated with the second bundle size, an indication of a subset of resources of the first set of resources, or a combination thereof. For example, if each resource of the first set of resources is configured with a respective one or more bundle sizes, the UE 115-c may include an indication of the resource configured with at least the second bundle size, and in some cases, may include an indication of a subset of resources corresponding to a subset of bundle sizes.

At 340, the base station 105-b may configure a second set of resources for the second signal based on the feedback message received at 335. For example, the base station 105-b may configure the second set of resources with a bundle size, which may be the second bundle size indicated in the feedback message. In some cases, however, the base station 105-b may configure the second set of resources with a bundle size different from the second bundle size. For instance, if the UE 115-c indicates, in the feedback message, a subset of bundle sizes, a subset of resources (e.g., associated with a subset of bundle sizes), a subset of channel estimation parameters, or the like, the base station 105-b may select a bundle size different from the second bundle size based on the indication(s). As an example, the base station 105-b may determine that a bundle size of a subset of bundle sizes indicated by the UE 115-c is associated with one or more channel estimation parameters, and may select the bundle size for the second signal based on the associated channel estimation parameters.

At 345, the base station 105-b may transmit, and the UE 115-c may receive, the second signal on the second set of resources in accordance with a bundle size. For example, the base station 105-b may transmit, and the UE 115-c may receive, the second signal in accordance with the second bundle size (e.g., selected at 330). The second signal may be an example of a reference signal, a downlink data transmission, or the like. For instance, the second signal may be an example of a precoded CSI-RS, a DMRS, etc.

FIG. 4 illustrates an example of a process flow 400 that supports bundle size reporting for PRGs in accordance with aspects of the present disclosure. In some examples, process flow 400 may implement aspects of wireless communications systems 100 and 200. For example, process flow 400 includes a UE 115-d and a UE 115-e, which may be examples of the corresponding devices described herein. In the process flow 400, the UE 115-d and the UE 115-e may be examples of sidelink devices communicating with one another via one or more sidelink connections (e.g., sidelink communication links, V2X links, or the like) in a sidelink communications system (e.g., V2X). For example, the UE 115-d may be an example of a receiving sidelink device, and the UE 115-e may be an example of a transmitting sidelink device.

At 405, the UE 115-e may transmit, and the UE 115-d may receive, control signaling via a sidelink channel, such as a PSCCH. The control signaling may be an example of sidelink control information (e.g., SCI-2). The control signaling may indicate a plurality of bundle sizes (i.e., candidate bundle sizes), a report configuration for a feedback message, or a combination thereof, for the UE 115-d to use in identifying and reporting bundle size information for PRGs.

At 410, the UE 115-e may transmit, and the UE 115-d may receive, a first signal via a sidelink channel, such as a PSSCH, a PSCCH, or the like. The first signal may be an example of a downlink data transmission, control signaling, a reference signal (e.g. DMRS, CSI-RS, etc.), or a combination thereof. For example, the first signal may be a CSI-RS that is multiplexed with a PSSCH: the PSSCH may be associated with a PSFCH feedback message (e.g., for HARQ feedback). The UE 115-*d* may receive the first signal on a first set of resources. In some cases, the first set of resources may be associated with a first bundle size of a PRG.

In some examples, each resource of the first set of resources may be configured with at least one respective candidate bundle size of a set of candidate bundle sizes. For example, a first resource of the first set of resources may be configured with a first candidate bundle size, a second resource of the first set of resources may be configured with a second candidate bundle size and a third candidate bundle size, and so forth. In some examples, the candidate bundle sizes may be indicated in the control signaling at 405.

At 415, the UE 115-*d* may optionally determine a set of candidate bundle sizes. In a first example, the UE 115-*d* may determine a set of candidate bundle sizes based on receiving an indication of the set of candidate bundle sizes in the control signaling at 405. In a second example, the set of candidate bundle sizes may correspond to the set of candidate bundle sizes with which the first set of resources of the first signal are configured. In a third example, the UE 115-*d* may determine a set of candidate bundle sizes for use in channel estimation (e.g., at 420). In some cases, the set of candidate bundle sizes may include bundle sizes associated with a capability of the UE 115-*d*.

In some examples, the set of candidate bundle sizes may correspond to the set of candidate bundle sizes indicated in the control signaling and the UE 115-*d* may refrain from identifying any additional candidate bundle sizes. In other examples, the UE 115-*d* may determine a set of candidate bundle sizes that includes those indicated in the control signaling and one or more additional candidate bundle sizes.

At 420, the UE 115-*d* may perform one or more channel estimations on the first signal received at 410, and may calculate or otherwise determine one or more channel estimation parameters based on performing the channel estimation(s). For example, the UE 115-*d* may perform channel estimation on the first signal based on receiving the first signal on the first set of resources.

In some cases, the UE 115-*d* may perform a set of channel estimations on the first signal using a set of candidate bundle sizes, which may be determined at 415. In some examples, the UE 115-*d* may perform a set of channel estimations on the first signal based on receiving the control signaling at 405 and using the set of candidate bundle sizes indicated in the control signaling. Here, the first signal may be an example of an unprecoded CSI-RS. Additionally, or alternatively, if the UE 115-*d* receives the first signal on the first set of resources, each resource configured with one or more respective candidate bundle sizes of a set of candidate bundle sizes, the UE 115-*d* may perform a set of channel estimations on the first signal using the configured candidate bundle sizes (e.g., based on receiving the first signal on the first set of resources). That is, the UE 115-*d* may perform channel estimation for a first resource of the first set of resources based on the one or more candidate bundle sizes with which the first resource is configured, may perform channel estimation for a second resource of the first set of resources based on the one or more candidate bundle sizes with which the second resource is configured, and so on.

At 425, the UE 115-*d* may identify a first bundle size for a PRG based on a characteristic of the first signal. For instance, the UE 115-*d* may identify the first bundle size based on performing channel estimation(s) on the first signal at 420. In some cases, the characteristic of the first signal may be based on (e.g., identified based on) the channel estimation. In some cases, the UE 115-*d* may identify the first bundle size based on performing the channel estimation(s) at 420 using a set of candidate bundle sizes. In some examples, the set of candidate bundle sizes may include the first bundle size.

At 430, the UE 115-*d* may select or otherwise identify a second bundle size for the PRG associated with a second signal. In some examples, the UE 115-*d* may identify the second bundle size based on identifying the first bundle size at 425. For example, the UE 115-*d* may identify the second bundle size according to a mapping between the first bundle size (e.g., determined at 425) and the second bundle size. In cases where the UE 115-*d* performs channel estimation(s) at 420 using a set of candidate bundle sizes, the UE 115-*d* may select the second bundle size from the set of candidate bundle sizes, for instance, based on a channel estimation from a set of channel estimations, a mapping between the first bundle size and the second bundle size, or a combination thereof. In cases where each resource of the first set of resources is configured with a respective one or more candidate bundle sizes, the second bundle size may correspond to a resource of the first set of resources.

For example, when the UE 115-*d* performs (e.g., at 420) a set of channel estimations on the first signal using a set of candidate bundle sizes, the UE 115-*d* may select the second bundle size from the set of candidate bundle sizes based on a channel estimation from the set of channel estimations. Here, the channel estimation may be associated with one or more channel estimation parameters indicated by the UE 115-*d*. That is, the UE 115-*d* may select the second bundle size based on comparing one or more channel estimation parameters (e.g., RSRP, RSRQ, SINR, CQI, RI, etc.) corresponding to respective channel estimations for each of the candidate bundle sizes. For instance, if a first candidate bundle size is associated with a relatively higher SINR value than a second candidate bundle size, the UE 115-*d* may select the first candidate bundle size as the second bundle size.

In some examples, the UE 115-*d* may select the second bundle size from the set of candidate bundle sizes indicated in the control signaling. In other examples, the UE 115-*d* may select the second bundle size from a set of candidate bundle sizes that includes those indicated in the control signaling and one or more additional candidate bundle sizes.

At 435, the UE 115-*d* may transmit, and the UE 115-*e* may receive, a feedback message indicating the second bundle size for the PRG associated with the second signal. The feedback message may be transmitted by the UE 115-*d* via a sidelink channel, such as a PSSCH, a PSFCH, or the like. The feedback message may be an example of a HARQ feedback message, a CSI feedback message, or a PRG feedback message (e.g., a dedicated feedback message for PRG size/bundle size reporting). For example, the UE 115-*d* may transmit the feedback message via a PSFCH for HARQ feedback information: the PSFCH may be associated with the PSSCH with which the first signal (e.g., CSI-RS) is multiplexed. Alternatively, the feedback message may be transmitted via PSSCH, for instance, using dedicated resources. In some examples, the feedback message may be an example of a PC5 message, such as a PC5 RRC message or a PC5 MAC-CE message, and may be transmitted by the UE 115-*d* via a PC5 communication link.

In some cases, the UE 115-*d* may transmit the feedback message based on a trigger being satisfied. Additionally, or alternatively, the UE 115-*d* may transmit the feedback message as part of CSI reporting, for instance, when a trigger for a CSI report is satisfied.

The UE 115-*d* may transmit the feedback message in accordance with a report configuration received via the control signaling at 405. For example, the report configuration may indicate a timing (e.g., periodic, aperiodic, semi-persistent scheduling, or the like) for transmitting the feedback message. The report configuration may also indicate resources on which the UE 115-*d* may transmit the feedback message, which may be resources dedicated for the feedback message (e.g., resources scheduled for reporting PRG size/bundle size), resources associated with a HARQ/ACK report, resources associated with a CSI feedback report, or the like.

In some examples, the UE 115-*d* may transmit, as part of the feedback message, an indication of a subset of bundle sizes from a set of candidate bundle sizes, an indication of a subset of channel estimation parameters corresponding to the subset of bundle sizes, or a combination thereof. For instance, if the UE 115-*d* performs a set of channel estimations at 420 using a set of candidate bundle sizes, the UE 115-*d* may select a subset of bundle sizes from the set of candidate bundle sizes based on the corresponding channel estimations. The UE 115-*d* may include an indication of the selected subset of bundle sizes and the corresponding channel estimation parameters in the feedback message at 435.

Additionally, or alternatively, the UE 115-*d* may transmit, as part of the feedback message, an indication of a resource of the first set of resources associated with the second bundle size, an indication of a subset of resources of the first set of resources, or a combination thereof. For example, if each resource of the first set of resources is configured with a respective one or more bundle sizes, the UE 115-*d* may include an indication of the resource configured with at least the second bundle size, and in some cases, may include an indication of a subset of resources corresponding to a subset of bundle sizes.

At 440, the UE 115-*e* may configure a second set of resources for the second signal based on the feedback message received at 435. For example, the UE 115-*e* may configure the second set of resources with a bundle size, which may be the second bundle size indicated in the feedback message. In some cases, however, the UE 115-*e* may configure the second set of resources with a bundle size different from the second bundle size. For instance, if the UE 115-*d* indicates, in the feedback message, a subset of bundle sizes, a subset of resources (e.g., associated with a subset of bundle sizes), a subset of channel estimation parameters, or the like, the UE 115-*e* may select a bundle size different from the second bundle size based on the indication(s). As an example, the UE 115-*e* may determine that a bundle size of a subset of bundle sizes indicated by the UE 115-*d* is associated with one or more channel estimation parameters, and may select the bundle size for the second signal based on the associated channel estimation parameters.

At 445, the UE 115-*e* may transmit, and the UE 115-*d* may receive, the second signal on the second set of resources in accordance with a bundle size. For example, the UE 115-*e* may transmit, and the UE 115-*d* may receive, the second signal in accordance with the second bundle size (e.g., selected at 430). The second signal may be an example of a reference signal, a downlink data transmission, or the like.

For instance, the second signal may be an example of a CSI-RS, a DMRS, etc. and may be transmitted via a sidelink channel, such as a PSSCH, PSCCH, or the like.

FIG. 5 shows a block diagram 500 of a device 505 that supports bundle size reporting for PRGs in accordance with aspects of the present disclosure. The device 505 may be an example of aspects of a UE 115 or a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to bundle size reporting for PRGs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to bundle size reporting for PRGs). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of bundle size reporting for PRGs as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first wireless device in accordance with examples as disclosed herein. For example, the communications manager 520 may be configured as or otherwise support a means for receiving a first signal from a second wireless device. The communications manager 520 may be configured as or otherwise support a means for identifying a first bundle size for a PRG based on a characteristic of the first signal. The communications manager 520 may be configured as or otherwise support a means for transmitting, to the second wireless device, a feedback message indicating a second bundle size for the PRG associated with a second signal based on identifying the first bundle size.

Additionally or alternatively, the communications manager 520 may support wireless communications at a first wireless device in accordance with examples as disclosed herein. For example, the communications manager 520 may be configured as or otherwise support a means for transmitting a first signal to a second wireless device. The communications manager 520 may be configured as or otherwise support a means for receiving, from the second wireless device, a feedback message indicating a first bundle size for a PRG associated with a second signal, the first bundle size based on a second bundle size associated with the first signal. The communications manager 520 may be configured as or otherwise support a means for transmitting, to the second wireless device, the second signal based on the feedback message.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improved PRG size selection. For example, the device 505 may perform channel estimation on a received signal to identify a PRG size that provides improved performance for subsequent signals received at the device 505. Additionally, a second wireless device may receive the selected PRG size in a feedback message and may select a PRG size that accounts for channel conditions at the device 505, which may, in turn, improve reliability and performance in subsequent communications. Improved performance may in turn be associated with increased efficiency in resource utilization, as well as reduced power consumption at the device 505, as the device 505 may avoid failed or repeated transmissions.

FIG. 6 shows a block diagram 600 of a device 605 that supports bundle size reporting for PRGs in accordance with aspects of the present disclosure. The device 605 may be an example of aspects of a device 505, a UE 115, or a base station 105 as described herein. The device 605 may include a receiver 610, a transmitter 615, and a communications manager 620. The device 605 may also include a processor.

Each of these components may be in communication with one another (e.g., via one or more buses).

The receiver 610 may provide a means for receiving information such as packets, user data, control information, or any combination thereof associated with various information channels (e.g., control channels, data channels, information channels related to bundle size reporting for PRGs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to bundle size reporting for PRGs). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of bundle size reporting for PRGs as described herein. For example, the communications manager 620 may include a first signal component 625, a bundle size component 630, a feedback message component 635, a second signal component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first wireless device in accordance with examples as disclosed herein. The first signal component 625 may be configured as or otherwise support a means for receiving a first signal from a second wireless device. The bundle size component 630 may be configured as or otherwise support a means for identifying a first bundle size for a PRG based on a characteristic of the first signal. The feedback message component 635 may be configured as or otherwise support a means for transmitting, to the second wireless device, a feedback message indicating a second bundle size for the PRG associated with a second signal based on identifying the first bundle size.

Additionally or alternatively, the communications manager 620 may support wireless communications at a first wireless device in accordance with examples as disclosed herein. The first signal component 625 may be configured as or otherwise support a means for transmitting a first signal to a second wireless device. The feedback message component 635 may be configured as or otherwise support a means for receiving, from the second wireless device, a feedback message indicating a first bundle size for a PRG associated with a second signal, the first bundle size based on a second bundle size associated with the first signal. The second signal component 640 may be configured as or otherwise support a means for transmitting, to the second wireless device, the second signal based on the feedback message.

FIG. 7 shows a block diagram 700 of a communications manager 720 that supports bundle size reporting for PRGs in accordance with aspects of the present disclosure. The communications manager 720 may be an example of aspects of a communications manager 520, a communications manager 620, or both, as described herein. The communications manager 720, or various components thereof, may be an example of means for performing various aspects of bundle size reporting for PRGs as described herein. For example, the communications manager 720 may include a first signal component 725, a bundle size component 730, a feedback message component 735, a second signal component 740, a channel estimation component 745, a control signaling component 750, or any combination thereof. Each of these components may communicate, directly or indirectly, with one another (e.g., via one or more buses).

The communications manager 720 may support wireless communications at a first wireless device in accordance with examples as disclosed herein. The first signal component 725 may be configured as or otherwise support a means for receiving a first signal from a second wireless device. The bundle size component 730 may be configured as or otherwise support a means for identifying a first bundle size for a PRG based on a characteristic of the first signal. The feedback message component 735 may be configured as or otherwise support a means for transmitting, to the second wireless device, a feedback message indicating a second bundle size for the PRG associated with a second signal based on identifying the first bundle size.

In some examples, the second signal component 740 may be configured as or otherwise support a means for receiving the second signal on a first set of resources in accordance with the second bundle size, where the first signal includes an unprecoded CSI-RS and the second signal includes a DMRS.

In some examples, to support identifying the first bundle size, the channel estimation component 745 may be configured as or otherwise support a means for performing channel estimation on the first signal based on receiving the first signal on a second set of resources associated with the first bundle size, where the first bundle size is identified based on the channel estimation.

In some examples, the bundle size component 730 may be configured as or otherwise support a means for identifying the second bundle size according to a mapping between the first bundle size and the second bundle size.

In some examples, to support identifying the first bundle size, the channel estimation component 745 may be configured as or otherwise support a means for performing a set of multiple channel estimations on the first signal using a set of multiple candidate bundle sizes, the method further including. In some examples, to support identifying the first bundle size, the bundle size component 730 may be configured as or otherwise support a means for selecting the second bundle size from the set of multiple candidate bundle sizes based on a channel estimation from the set of multiple channel estimations.

In some examples, the feedback message component 735 may be configured as or otherwise support a means for transmitting, as part of the feedback message, an indication of a subset of bundle sizes from the set of multiple candidate bundle sizes, an indication of a subset of channel estimation parameters corresponding to the subset of bundle sizes, or a combination thereof.

In some examples, the second signal component 740 may be configured as or otherwise support a means for receiving the second signal on a first set of resources in accordance with the second bundle size, where the first signal includes an unprecoded CSI-RS and the second signal includes a precoded CSI-RS.

In some examples, selecting the second bundle size is based on a mapping between the first bundle size and the second bundle size.

In some examples, the control signaling component 750 may be configured as or otherwise support a means for receiving control signaling indicating a set of multiple bundle sizes, where performing the set of multiple channel estimations is based on receiving the control signaling.

In some examples, to support identifying the first bundle size, the first signal component 725 may be configured as or otherwise support a means for receiving the first signal on a set of multiple resources, where each resource of the set of multiple resources is configured with at least one respective candidate bundle size of a set of multiple candidate bundle sizes. In some examples, to support identifying the first bundle size, the channel estimation component 745 may be configured as or otherwise support a means for performing a set of multiple channel estimations on the first signal using the set of multiple candidate bundle sizes based on receiving the first signal on the set of multiple resources, the method further including. In some examples, to support identifying the first bundle size, the bundle size component 730 may be configured as or otherwise support a means for selecting the second bundle size from the set of multiple candidate bundle sizes based on a channel estimation from the set of multiple channel estimations.

In some examples, the feedback message component 735 may be configured as or otherwise support a means for transmitting, as part of the feedback message, an indication of a resource of the set of multiple resources associated with the second bundle size, an indication of a subset of resources of the set of multiple resources, or a combination thereof.

In some examples, the second signal component 740 may be configured as or otherwise support a means for receiving the second signal on a first set of resources in accordance with the second bundle size, where the first signal includes a precoded CSI-RS and the second signal includes a precoded CSI-RS or a DMRS.

In some examples, the control signaling component 750 may be configured as or otherwise support a means for receiving control signaling indicating a report configuration for the feedback message. In some examples, the feedback message component 735 may be configured as or otherwise support a means for transmitting the feedback message in accordance with the report configuration. In some examples, the feedback message is transmitted based on a trigger being satisfied. In some examples, the feedback message is a HARQ message, a CSI feedback message, or a scheduled feedback message.

In some examples, the first signal and the second signal are sidelink signals.

Additionally or alternatively, the communications manager 720 may support wireless communications at a first wireless device in accordance with examples as disclosed herein. In some examples, the first signal component 725 may be configured as or otherwise support a means for transmitting a first signal to a second wireless device. In some examples, the feedback message component 735 may be configured as or otherwise support a means for receiving, from the second wireless device, a feedback message indicating a first bundle size for a PRG associated with a second signal, the first bundle size based on a second bundle size associated with the first signal. The second signal component 740 may be configured as or otherwise support a means for transmitting, to the second wireless device, the second signal based on the feedback message.

In some examples, to support transmitting the second signal, the second signal component 740 may be configured as or otherwise support a means for transmitting the second signal on a first set of resources in accordance with the first bundle size, where the first signal includes an unprecoded CSI-RS and the second signal includes a DMRS.

In some examples, the feedback message component 735 may be configured as or otherwise support a means for receiving, as part of the feedback message, an indication of a set of bundle sizes including the first bundle size, an indication of a set of channel estimation parameters for the first signal corresponding to the set of bundle sizes, or a combination thereof. In some examples, the second signal component 740 may be configured as or otherwise support a means for transmitting the second signal on a first set of resources in accordance with a bundle size of the set of bundle sizes based on the feedback message, where the first signal includes an unprecoded CSI-RS and the second signal includes a precoded CSI-RS.

In some examples, the control signaling component 750 may be configured as or otherwise support a means for transmitting control signaling indicating a set of multiple bundle sizes including at least the set of bundle sizes, where receiving the feedback message is based on transmitting the control signaling.

In some examples, to support transmitting the first signal, the first signal component 725 may be configured as or otherwise support a means for transmitting the first signal on a set of multiple resources, where each resource of the set of multiple resources is configured with at least one respective candidate bundle size of a set of multiple candidate bundle sizes, the set of multiple candidate bundle sizes including the first bundle size.

In some examples, the feedback message component 735 may be configured as or otherwise support a means for receiving, as part of the feedback message, an indication of a resource of the set of multiple resources associated with the first bundle size, an indication of a subset of resources of the set of multiple resources, or a combination thereof.

In some examples, the second signal component 740 may be configured as or otherwise support a means for transmitting the second signal on a first set of resources in accordance with the first bundle size, where the first signal is a precoded CSI-RS and the second signal is a precoded CSI-RS or a DMRS.

In some examples, the control signaling component 750 may be configured as or otherwise support a means for transmitting control signaling indicating a report configuration for the feedback message. In some examples, the feedback message component 735 may be configured as or otherwise support a means for receiving the feedback message in accordance with the report configuration. In some examples, the feedback message is a HARQ message, a CSI feedback message, or a scheduled feedback message.

In some examples, the first signal and the second signal are sidelink signals.

FIG. 8 shows a diagram of a system 800 including a device 805 that supports bundle size reporting for PRGs in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting bundle size reporting for PRGs). For example, the device 805 or a component of the device 805 may include a processor 840 and memory 830 coupled to the processor 840, the processor 840 and memory 830 configured to perform various functions described herein.

The communications manager 820 may support wireless communications at a first wireless device in accordance with examples as disclosed herein. For example, the communications manager 820 may be configured as or otherwise support a means for receiving a first signal from a second wireless device. The communications manager 820 may be configured as or otherwise support a means for identifying a first bundle size for a PRG based on a characteristic of the first signal. The communications manager 820 may be configured as or otherwise support a means for transmitting, to the second wireless device, a feedback message indicating a second bundle size for the PRG associated with a second signal based on identifying the first bundle size.

Additionally or alternatively, the communications manager 820 may support wireless communications at a first wireless device in accordance with examples as disclosed herein. For example, the communications manager 820 may be configured as or otherwise support a means for transmitting a first signal to a second wireless device. The communications manager 820 may be configured as or otherwise support a means for receiving, from the second wireless device, a feedback message indicating a first bundle size for a PRG associated with a second signal, the first bundle size based on a second bundle size associated with the first signal. The communications manager 820 may be configured as or otherwise support a means for transmitting, to the second wireless device, the second signal based on the feedback message.

By including or configuring the communications manager 820 in accordance with examples as described herein, the device 805 may support techniques for improved PRG size selection. For example, the device 805 may perform channel estimation on a received signal to identify a PRG size that provides improved performance for subsequent signals received at the device 805. Additionally, a second wireless device may receive the selected PRG size in a feedback message and may select a PRG size that accounts for channel conditions at the device 805, which may, in turn, improve reliability and performance in subsequent communications. Improved performance may in turn be associated with increased efficiency in resource utilization, reduced system latency, and increased throughput.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of bundle size reporting for PRGs as described herein, or the processor 840 and the memory 830 may be otherwise configured to perform or support such operations.

FIG. 9 shows a diagram of a system 900 including a device 905 that supports bundle size reporting for PRGs in accordance with aspects of the present disclosure. The device 905 may be an example of or include the components of a device 505, a device 605, or a base station 105 as described herein. The device 905 may communicate wirelessly with one or more base stations 105, UEs 115, or any combination thereof. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (e.g., operatively, communicatively, functionally, electronically, electrically) via one or more buses (e.g., a bus 950).

The network communications manager 910 may manage communications with a core network 130 (e.g., via one or more wired backhaul links). For example, the network communications manager 910 may manage the transfer of data communications for client devices, such as one or more UEs 115.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 515, a transmitter 615, a receiver 510, a receiver 610, or any combination thereof or component thereof, as described herein.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into processor 940. The processor 940 may be configured to execute computer-readable instructions stored in a memory (e.g., the memory 930) to cause the device 905 to perform various functions (e.g., functions or tasks supporting bundle size reporting for PRGs). For example, the device 905 or a component of the device 905 may include a processor 940 and memory 930 coupled to the processor 940, the processor 940 and memory 930 configured to perform various functions described herein.

The inter-station communications manager 945 may manage communications with other base stations 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between base stations 105.

The communications manager 920 may support wireless communications at a first wireless device in accordance with examples as disclosed herein. For example, the communications manager 920 may be configured as or otherwise support a means for receiving a first signal from a second wireless device. The communications manager 920 may be configured as or otherwise support a means for identifying a first bundle size for a PRG based on a characteristic of the first signal. The communications manager 920 may be configured as or otherwise support a means for transmitting, to the second wireless device, a feedback message indicating a second bundle size for the PRG associated with a second signal based on identifying the first bundle size.

Additionally or alternatively, the communications manager 920 may support wireless communications at a first wireless device in accordance with examples as disclosed herein. For example, the communications manager 920 may be configured as or otherwise support a means for transmitting a first signal to a second wireless device. The communications manager 920 may be configured as or otherwise support a means for receiving, from the second wireless device, a feedback message indicating a first bundle size for a PRG associated with a second signal, the first bundle size based on a second bundle size associated with the first signal. The communications manager 920 may be configured as or otherwise support a means for transmitting, to the second wireless device, the second signal based on the feedback message.

By including or configuring the communications manager 920 in accordance with examples as described herein, the device 905 may support techniques for improved PRG size selection. For example, the device 905 may perform channel estimation on a received signal to identify a PRG size that provides improved performance for subsequent signals received at the device 905. Additionally, a second wireless device may receive the selected PRG size in a feedback message and may select a PRG size that accounts for channel conditions at the device 905, which may, in turn, improve reliability and performance in subsequent communications. Improved performance may in turn be associated with increased efficiency in resource utilization, reduced system latency, and increased throughput.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of bundle size reporting for PRGs as described herein, or the processor 940 and the memory 930 may be otherwise configured to perform or support such operations.

Figure 10:
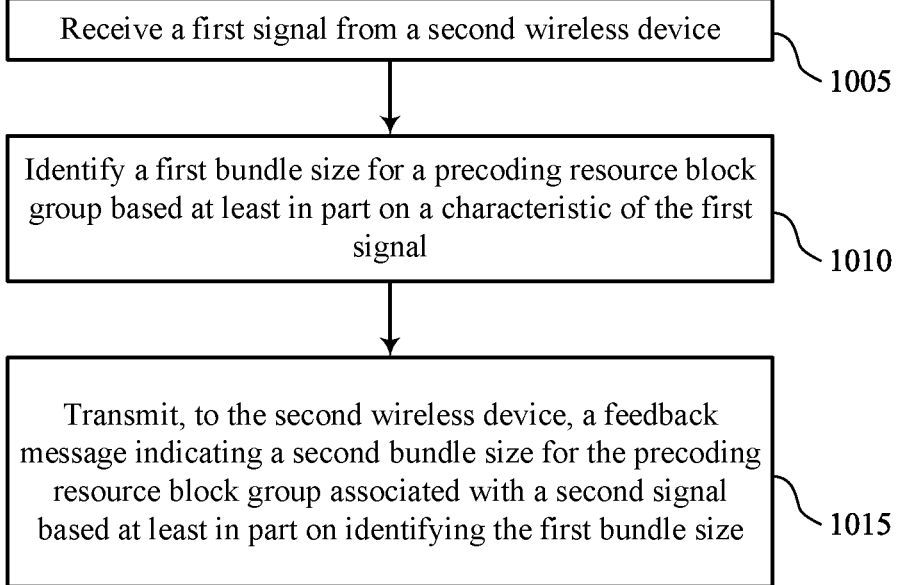

FIG. 10 shows a flowchart illustrating a method 1000 that supports bundle size reporting for PRGs in accordance with aspects of the present disclosure. The operations of the method 1000 may be implemented by a UE or a base station or its components as described herein. For example, the operations of the method 1000 may be performed by a UE 115 or a base station 105 as described with reference to FIGS. 1 through 9. In some examples, a UE or a base station may execute a set of instructions to control the functional elements of the UE or the base station to perform the described functions. Additionally or alternatively, the UE or the base station may perform aspects of the described functions using special-purpose hardware.

At 1005, the method may include receiving a first signal from a second wireless device. The operations of 1005 may be performed in accordance with examples as disclosed herein. In some examples, aspects of the operations of 1005 may be performed by a first signal component 725 as described with reference to FIG. 7.

At 1010, the method may include identifying a first bundle size for a PRG based on a characteristic of the first signal. The operations of 1010 may be performed in accordance with examples as disclosed herein. In some examples, aspects of the operations of 1010 may be performed by a bundle size component 730 as described with reference to FIG. 7.

At 1015, the method may include transmitting, to the second wireless device, a feedback message indicating a second bundle size for the PRG associated with a second signal based on identifying the first bundle size. The operations of 1015 may be performed in accordance with examples as disclosed herein. In some examples, aspects of the operations of 1015 may be performed by a feedback message component 735 as described with reference to FIG. 7.

FIG. 11 shows a flowchart illustrating a method 1100 that supports bundle size reporting for PRGs in accordance with aspects of the present disclosure. The operations of the method 1100 may be implemented by a UE or a base station or its components as described herein. For example, the operations of the method 1100 may be performed by a UE 115 or a base station 105 as described with reference to FIGS. 1 through 9. In some examples, a UE or a base station may execute a set of instructions to control the functional elements of the UE or the base station to perform the described functions. Additionally or alternatively, the UE or the base station may perform aspects of the described functions using special-purpose hardware.

At 1105, the method may include receiving a first signal from a second wireless device, where the first signal comprises an unprecoded CSI-RS. The operations of 1105 may be performed in accordance with examples as disclosed herein. In some examples, aspects of the operations of 1105 may be performed by a first signal component 725 as described with reference to FIG. 7.

At 1110, the method may include receiving control signaling indicating a report configuration for the feedback message. The operations of 1110 may be performed in accordance with examples as disclosed herein. In some examples, aspects of the operations of 1110 may be performed by a control signaling component 750 as described with reference to FIG. 7.

At 1115, the method may include performing channel estimation on the first signal based on receiving the first signal on a first set of resources. The operations of 1115 may be performed in accordance with examples as disclosed herein. In some examples, aspects of the operations of 1115 may be performed by a channel estimation component 745 as described with reference to FIG. 7.

At 1120, the method may include identifying a first bundle size associated with the first set of resources for a PRG based on a characteristic of the first signal, where the first bundle size is identified based on the channel estimation. The operations of 1120 may be performed in accordance with examples as disclosed herein. In some examples, aspects of the operations of 1120 may be performed by a bundle size component 730 as described with reference to FIG. 7.

At 1125, the method may include transmitting, to the second wireless device in accordance with the report configuration, a feedback message indicating a second bundle size for the PRG associated with a second signal based on identifying the first bundle size. The operations of 1125 may be performed in accordance with examples as disclosed herein. In some examples, aspects of the operations of 1125 may be performed by a feedback message component 735 as described with reference to FIG. 7.

At 1130, the method may include receiving the second signal on a second set of resources in accordance with the second bundle size, where the second signal includes a DMRS. The operations of 1135 may be performed in accordance with examples as disclosed herein. In some examples, aspects of the operations of 1135 may be performed by a second signal component 740 as described with reference to FIG. 7.

FIG. 12 shows a flowchart illustrating a method 1200 that supports bundle size reporting for PRGs in accordance with aspects of the present disclosure. The operations of the method 1200 may be implemented by a UE or a base station or its components as described herein. For example, the operations of the method 1200 may be performed by a UE 115 or a base station 105 as described with reference to FIGS. 1 through 9. In some examples, a UE or a base station may execute a set of instructions to control the functional elements of the UE or the base station to perform the described functions. Additionally or alternatively, the UE or the base station may perform aspects of the described functions using special-purpose hardware.

At 1205, the method may include transmitting a first signal to a second wireless device. The operations of 1205 may be performed in accordance with examples as disclosed herein. In some examples, aspects of the operations of 1205 may be performed by a first signal component 725 as described with reference to FIG. 7.

At 1210, the method may include receiving, from the second wireless device, a feedback message indicating a first bundle size for a PRG associated with a second signal, the first bundle size based on a second bundle size associated with the first signal. The operations of 1210 may be performed in accordance with examples as disclosed herein. In some examples, aspects of the operations of 1210 may be performed by a feedback message component 735 as described with reference to FIG. 7.

At 1215, the method may include transmitting, to the second wireless device, the second signal based on the feedback message. The operations of 1215 may be performed in accordance with examples as disclosed herein. In some examples, aspects of the operations of 1215 may be performed by a second signal component 740 as described with reference to FIG. 7.

FIG. 13 shows a flowchart illustrating a method 1300 that supports bundle size reporting for PRGs in accordance with aspects of the present disclosure. The operations of the method 1300 may be implemented by a UE or a base station or its components as described herein. For example, the operations of the method 1300 may be performed by a UE 115 or a base station 105 as described with reference to FIGS. 1 through 9. In some examples, a UE or a base station may execute a set of instructions to control the functional elements of the UE or the base station to perform the described functions. Additionally or alternatively, the UE or the base station may perform aspects of the described functions using special-purpose hardware.

At 1305, the method may include transmitting a first signal to a second wireless device. The operations of 1305 may be performed in accordance with examples as disclosed herein. In some examples, aspects of the operations of 1305 may be performed by a first signal component 725 as described with reference to FIG. 7.

At 1310, the method may include receiving, from the second wireless device, a feedback message indicating a first bundle size for a PRG associated with a second signal, the first bundle size based on a second bundle size associated with the first signal. The operations of 1310 may be performed in accordance with examples as disclosed herein. In some examples, aspects of the operations of 1310 may be performed by a feedback message component 735 as described with reference to FIG. 7.

At 1315, the method may include receiving, as part of the feedback message, an indication of a set of bundle sizes including the first bundle size, an indication of a set of channel estimation parameters for the first signal corresponding to the set of bundle sizes, or a combination thereof. The operations of 1315 may be performed in accordance with examples as disclosed herein. In some examples, aspects of the operations of 1315 may be performed by a feedback message component 735 as described with reference to FIG. 7.

At 1320, the method may include transmitting the second signal on a first set of resources in accordance with a bundle size of the set of bundle sizes based on the feedback message, where the first signal includes an unprecoded CSI-RS and the second signal includes a precoded CSI-RS. The operations of 1320 may be performed in accordance with examples as disclosed herein. In some examples, aspects of the operations of 1320 may be performed by a second signal component 740 as described with reference to FIG. 7.

The following provides an overview of aspects of the present disclosure:

Aspect 1: A method for wireless communications at a first wireless device, comprising: receiving a first signal from a second wireless device: identifying a first bundle size for a precoding resource block group based at least in part on a characteristic of the first signal; and transmitting, to the second wireless device, a feedback message indicating a second bundle size for the precoding resource block group associated with a second signal based at least in part on identifying the first bundle size.

Aspect 2: The method of aspect 1, further comprising: receiving the second signal on a first set of resources in accordance with the second bundle size, wherein the first signal comprises an unprecoded CSI-RS and the second signal comprises a DMRS.

Aspect 3: The method of aspect 2, wherein identifying the first bundle size further comprises: performing channel estimation on the first signal based at least in part on receiving the first signal on a second set of resources associated with the first bundle size, wherein the first bundle size is identified based at least in part on the channel estimation.

Aspect 4: The method of aspect 3, further comprising: identifying the second bundle size according to a mapping between the first bundle size and the second bundle size.

Aspect 5: The method of any of aspects 1 through 4, wherein identifying the first bundle size further comprises: performing a plurality of channel estimations on the first signal using a plurality of candidate bundle sizes, the method further comprising: selecting the second bundle size from the plurality of candidate bundle sizes based at least in part on a channel estimation from the plurality of channel estimations.

Aspect 6: The method of aspect 5, further comprising: transmitting, as part of the feedback message, an indication of a subset of bundle sizes from the plurality of candidate bundle sizes, an indication of a subset of channel estimation parameters corresponding to the subset of bundle sizes, or a combination thereof.

Aspect 7: The method of any of aspects 5 through 6, further comprising: receiving the second signal on a first set of resources in accordance with the second bundle size, wherein the first signal comprises an unprecoded CSI-RS and the second signal comprises a precoded CSI-RS.

Aspect 8: The method of any of aspects 5 through 7, wherein selecting the second bundle size is based at least in part on a mapping between the first bundle size and the second bundle size.

Aspect 9: The method of any of aspects 5 through 8, further comprising: receiving control signaling indicating a plurality of bundle sizes, wherein performing the plurality of channel estimations is based at least in part on receiving the control signaling.

Aspect 10: The method of any of aspects 1 through 9, wherein identifying the first bundle size further comprises: receiving the first signal on a plurality of resources, wherein each resource of the plurality of resources is configured with at least one respective candidate bundle size of a plurality of candidate bundle sizes; and performing a plurality of channel estimations on the first signal using the plurality of candidate bundle sizes based at least in part on receiving the first signal on the plurality of resources, the method further comprising: selecting the second bundle size from the plurality of candidate bundle sizes based at least in part on a channel estimation from the plurality of channel estimations.

Aspect 11: The method of aspect 10, further comprising: transmitting, as part of the feedback message, an indication of a resource of the plurality of resources associated with the second bundle size, an indication of a subset of resources of the plurality of resources, or a combination thereof.

Aspect 12: The method of any of aspects 10 through 11, further comprising: receiving the second signal on a first set of resources in accordance with the second bundle size, wherein the first signal comprises a precoded CSI-RS and the second signal comprises a precoded CSI-RS or a DMRS.

Aspect 13: The method of any of aspects 1 through 12, further comprising: receiving control signaling indicating a report configuration for the feedback message; and transmitting the feedback message in accordance with the report configuration.

Aspect 14: The method of any of aspects 1 through 13, wherein the feedback message is transmitted based at least in part on a trigger being satisfied.

Aspect 15: The method of any of aspects 1 through 14, wherein the feedback message is a HARQ message, a CSI feedback message, or a scheduled feedback message.

Aspect 16: The method of any of aspects 1 through 15, wherein the first signal and the second signal are sidelink signals.

Aspect 17: A method for wireless communications at a first wireless device, comprising: transmitting a first signal to a second wireless device; receiving, from the second wireless device, a feedback message indicating a first bundle size for a precoding resource block group associated with a second signal, the first bundle size based at least in part on a second bundle size associated with the first signal; and transmitting, to the second wireless device, the second signal based at least in part on the feedback message.

Aspect 18: The method of aspect 17, wherein transmitting the second signal further comprises: transmitting the second signal on a first set of resources in accordance with the first bundle size, wherein the first signal comprises an unprecoded CSI-RS and the second signal comprises a DMRS.

Aspect 19: The method of any of aspects 17 through 18, further comprising: receiving, as part of the feedback message, an indication of a set of bundle sizes including the first bundle size, an indication of a set of channel estimation parameters for the first signal corresponding to the set of bundle sizes, or a combination thereof; and transmitting the second signal on a first set of resources in accordance with a bundle size of the set of bundle sizes based at least in part on the feedback message, wherein the first signal comprises an unprecoded CSI-RS and the second signal comprises a precoded CSI-RS.

Aspect 20: The method of aspect 19, further comprising: transmitting control signaling indicating a plurality of bundle sizes comprising at least the set of bundle sizes, wherein receiving the feedback message is based at least in part on transmitting the control signaling.

Aspect 21: The method of any of aspects 17 through 20, wherein transmitting the first signal further comprises: transmitting the first signal on a plurality of resources, wherein each resource of the plurality of resources is configured with at least one respective candidate bundle size of a plurality of candidate bundle sizes, the plurality of candidate bundle sizes including the first bundle size.

Aspect 22: The method of aspect 21, further comprising: receiving, as part of the feedback message, an indication of a resource of the plurality of resources associated with the first bundle size, an indication of a subset of resources of the plurality of resources, or a combination thereof.

Aspect 23: The method of any of aspects 21 through 22, further comprising: transmitting the second signal on a first set of resources in accordance with the first bundle size, wherein the first signal is a precoded CSI-RS and the second signal is a precoded CSI-RS or a DMRS.

Aspect 24: The method of any of aspects 17 through 23, further comprising: transmitting control signaling indicating a report configuration for the feedback message; and receiving the feedback message in accordance with the report configuration.

Aspect 25: The method of any of aspects 17 through 24, wherein the feedback message is a HARQ message, a CSI feedback message, or a scheduled feedback message.

Aspect 26: The method of any of aspects 17 through 25, wherein the first signal and the second signal are sidelink signals.

Aspect 27: An apparatus for wireless communications at a first wireless device, comprising a processor: memory coupled with the processor; and instructions stored in the memory and executable by the processor to cause the apparatus to perform a method of any of aspects 1 through 16.

Aspect 28: An apparatus for wireless communications at a first wireless device, comprising at least one means for performing a method of any of aspects 1 through 16.

Aspect 29: A non-transitory computer-readable medium storing code for wireless communications at a first wireless device, the code comprising instructions executable by a processor to perform a method of any of aspects 1 through 16.

Aspect 30: An apparatus for wireless communications at a first wireless device, comprising a processor: memory coupled with the processor; and instructions stored in the memory and executable by the processor to cause the apparatus to perform a method of any of aspects 17 through 26.

Aspect 31: An apparatus for wireless communications at a first wireless device, comprising at least one means for performing a method of any of aspects 17 through 26.

Aspect 32: A non-transitory computer-readable medium storing code for wireless communications at a first wireless device, the code comprising instructions executable by a processor to perform a method of any of aspects 17 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:
receiving a first signal from a second wireless device;
identifying a first bundle size for a precoding resource block group based at least in part on a characteristic of the first signal; and
transmitting, to the second wireless device, a feedback message indicating a second bundle size for the precoding resource block group associated with a second signal based at least in part on identifying the first bundle size.

2. The method of claim 1, further comprising:
receiving the second signal on a first set of resources in accordance with the second bundle size, wherein the first signal comprises an unprecoded channel state information reference signal and the second signal comprises a demodulation reference signal.

3. The method of claim 2, wherein identifying the first bundle size further comprises:
performing channel estimation on the first signal based at least in part on receiving the first signal on a second set of resources associated with the first bundle size, wherein the first bundle size is identified based at least in part on the channel estimation.

4. The method of claim 3, further comprising:
identifying the second bundle size according to a mapping between the first bundle size and the second bundle size.

5. The method of claim 1, wherein identifying the first bundle size further comprises:
performing a plurality of channel estimations on the first signal using a plurality of candidate bundle sizes, the method further comprising:
selecting the second bundle size from the plurality of candidate bundle sizes based at least in part on a channel estimation from the plurality of channel estimations.

6. The method of claim 5, further comprising:
transmitting, as part of the feedback message, an indication of a subset of bundle sizes from the plurality of candidate bundle sizes, an indication of a subset of channel estimation parameters corresponding to the subset of bundle sizes, or a combination thereof.

7. The method of claim 5, further comprising:
receiving the second signal on a first set of resources in accordance with the second bundle size, wherein the first signal comprises an unprecoded channel state information reference signal and the second signal comprises a precoded channel state information reference signal.

8. The method of claim 5, wherein selecting the second bundle size is based at least in part on a mapping between the first bundle size and the second bundle size.

9. The method of claim 5, further comprising:
receiving control signaling indicating a plurality of bundle sizes, wherein performing the plurality of channel estimations is based at least in part on receiving the control signaling.

10. The method of claim 1, wherein identifying the first bundle size further comprises:
receiving the first signal on a plurality of resources, wherein each resource of the plurality of resources is configured with at least one respective candidate bundle size of a plurality of candidate bundle sizes; and
performing a plurality of channel estimations on the first signal using the plurality of candidate bundle sizes based at least in part on receiving the first signal on the plurality of resources, the method further comprising:
selecting the second bundle size from the plurality of candidate bundle sizes based at least in part on a channel estimation from the plurality of channel estimations.

11. The method of claim 10, further comprising:
transmitting, as part of the feedback message, an indication of a resource of the plurality of resources associated with the second bundle size, an indication of a subset of resources of the plurality of resources, or a combination thereof.

12. The method of claim 10, further comprising:
receiving the second signal on a first set of resources in accordance with the second bundle size, wherein the first signal comprises a precoded channel state information reference signal and the second signal comprises a precoded channel state information reference signal or a demodulation reference signal.

13. The method of claim 1, further comprising:
receiving control signaling indicating a report configuration for the feedback message; and
transmitting the feedback message in accordance with the report configuration.

14. The method of claim 1, wherein the feedback message is transmitted based at least in part on a trigger being satisfied.

15. The method of claim 1, wherein the feedback message is a hybrid automatic repeat request message, a channel state information feedback message, or a scheduled feedback message.

16. The method of claim 1, wherein the first signal and the second signal are sidelink signals.

17. A method for wireless communications at a first wireless device, comprising:
transmitting a first signal to a second wireless device;
receiving, from the second wireless device, a feedback message indicating a first bundle size for a precoding resource block group associated with a second signal, the first bundle size based at least in part on a second bundle size associated with the first signal; and transmitting, to the second wireless device, the second signal based at least in part on the feedback message.

18. The method of claim 17, wherein transmitting the second signal further comprises:

transmitting the second signal on a first set of resources in accordance with the first bundle size, wherein the first signal comprises an unprecoded channel state information reference signal and the second signal comprises a demodulation reference signal.

19. The method of claim 17, further comprising:

receiving, as part of the feedback message, an indication of a set of bundle sizes including the first bundle size, an indication of a set of channel estimation parameters for the first signal corresponding to the set of bundle sizes, or a combination thereof; and transmitting the second signal on a first set of resources in accordance with a bundle size of the set of bundle sizes based at least in part on the feedback message, wherein the first signal comprises an unprecoded channel state information reference signal and the second signal comprises a precoded channel state information reference signal.

20. The method of claim 19, further comprising:

transmitting control signaling indicating a plurality of bundle sizes comprising at least the set of bundle sizes, wherein receiving the feedback message is based at least in part on transmitting the control signaling.

21. The method of claim 17, wherein transmitting the first signal further comprises:

transmitting the first signal on a plurality of resources, wherein each resource of the plurality of resources is configured with at least one respective candidate bundle size of a plurality of candidate bundle sizes, the plurality of candidate bundle sizes including the first bundle size.

22. The method of claim 21, further comprising:

receiving, as part of the feedback message, an indication of a resource of the plurality of resources associated with the first bundle size, an indication of a subset of resources of the plurality of resources, or a combination thereof.

23. The method of claim 21, further comprising:

transmitting the second signal on a first set of resources in accordance with the first bundle size, wherein the first signal is a precoded channel state information reference signal and the second signal is a precoded channel state information reference signal or a demodulation reference signal.

24. The method of claim 17, further comprising:

transmitting control signaling indicating a report configuration for the feedback message; and receiving the feedback message in accordance with the report configuration.

25. The method of claim 17, wherein the feedback message is a hybrid automatic repeat request message, a channel state information feedback message, or a scheduled feedback message.

26. The method of claim 17, wherein the first signal and the second signal are sidelink signals.

27. An apparatus for wireless communications at a first wireless device, comprising:

a processor;

memory coupled with the processor; and instructions stored in the memory and executable by the processor to cause the apparatus to:

receive a first signal from a second wireless device;

identify a first bundle size for a precoding resource block group based at least in part on a characteristic of the first signal; and transmit, to the second wireless device, a feedback message indicating a second bundle size for the precoding resource block group associated with a second signal based at least in part on identifying the first bundle size.

28. The apparatus of claim 27, wherein the instructions are further executable by the processor to cause the apparatus to:

receive the second signal on a first set of resources in accordance with the second bundle size, wherein the first signal comprises an unprecoded channel state information reference signal and the second signal comprises a demodulation reference signal.

29. An apparatus for wireless communications at a first wireless device, comprising:

a processor;

memory coupled with the processor; and instructions stored in the memory and executable by the processor to cause the apparatus to:

transmit a first signal to a second wireless device;

receive, from the second wireless device, a feedback message indicating a first bundle size for a precoding resource block group associated with a second signal, the first bundle size based at least in part on a second bundle size associated with the first signal; and transmit, to the second wireless device, the second signal based at least in part on the feedback message.

30. The apparatus of claim 29, wherein the instructions to transmit the second signal are further executable by the processor to cause the apparatus to:

transmit the second signal on a first set of resources in accordance with the first bundle size, wherein the first signal comprises an unprecoded channel state information reference signal and the second signal comprises a demodulation reference signal.

\* \* \* \* \*